United States Patent [19]
Wu et al.

[11] Patent Number: 5,963,036
[45] Date of Patent: Oct. 5, 1999

[54] WELL LOGGING APPARATUS AND METHOD FOR DETERMINING PROPERTIES OF EARTH FORMATIONS THAT HAVE BEEN INVADED BY BOREHOLE FLUID

[75] Inventors: Peter T. Wu, Sugar Land; Jacques R. Tabanou, Houston, both of Tex.

[73] Assignee: Schlumberger Technology Corporation, Sugar Land, Tex.

[21] Appl. No.: 08/855,968

[22] Filed: May 14, 1997

Related U.S. Application Data

[63] Continuation-in-part of application No. 08/789,902, Jan. 29, 1997
[60] Provisional application No. 60/011,275, Feb. 7, 1996, and provisional application No. 60/017,956, May 20, 1996.
[51] Int. Cl.$^6$ ............................ G01V 3/18; G01V 3/12
[52] U.S. Cl. ............................................. 324/338
[58] Field of Search ................................ 324/333, 324, 324/338, 339, 334, 343; 702/6, 7, 10, 11, 12, 13

[56] References Cited

U.S. PATENT DOCUMENTS

| | | |
|---|---|---|
| 3,305,771 | 2/1967 | Arps . |
| 3,551,797 | 12/1970 | Gouilloud et al. . |
| 3,849,721 | 11/1974 | Calvert . |
| 4,107,597 | 8/1978 | Meador et al. . |
| 4,185,238 | 1/1980 | Huchital et al. . |
| 4,209,747 | 6/1980 | Huchital . |
| 4,278,941 | 7/1981 | Freedman . |
| 4,300,098 | 11/1981 | Huchital et al. . |
| 4,451,789 | 5/1984 | Meador . |
| 4,468,623 | 8/1984 | Gianzero et al. . |
| 4,511,843 | 4/1985 | Thoraval . |
| 4,538,109 | 8/1985 | Clark . |
| 4,553,097 | 11/1985 | Clark . |
| 4,567,759 | 2/1986 | Ekstrom et al. . |
| 4,622,518 | 11/1986 | Cox et al. . |
| 4,626,785 | 12/1986 | Hagiwara . |

(List continued on next page.)

OTHER PUBLICATIONS

Anderson, B. and Chew, W.C., "A New High Speed Technique For Calculating Synthetic Induction and DPT Logs," SPWLA 25th Annual Logging Symposium (Jun. 10–13, 1984), Paper HH.

(List continued on next page.)

*Primary Examiner*—Jay Patidar
*Attorney, Agent, or Firm*—Martin Novack; Wayne I. Kanak; Brigitte L. Jeffrey

[57] ABSTRACT

A method and apparatus is disclosed for determining the properties of formations surrounding an earth borehole that have been invaded by borehole fluid to form an invaded zone. Properties determined in one embodiment are invaded zone resistivity Rxo, diameter of invasion DI, and uninvaded formation resistivity Rt, and the following steps are performed: (a) suspending a logging device in the borehole; (b) transmitting electromagnetic energy from a transmitter location on the logging device, and receiving the transmitted electromagnetic energy at receiver locations on the logging device for a first transmitter-to-receivers spacing associated with the transmitter and receiver locations; (c) determining, from the received electromagnetic energy, measurement characteristics associated with the first transmitter-to-receivers spacing; (d) repeating steps (b) and (c) for a plurality of further transmitter-to-receivers spacings to obtain measurement characteristics for the plurality of further transmitter-to-receivers spacings; (e) generating a model of formation of resistivity Rt with an invaded zone of resistivity Rxo and diameter of invasion DI; (f) selecting values of Rxo, DI, and Rt that would produce model measurement characteristics that substantially correspond, for each of a plurality of the transmitter-to-receiver spacings, with the actual measurement characteristics for the respective plurality of transmitter-to-receiver spacings; and (g) outputting the selected model values of Rxo, DI, and Rt.

26 Claims, 27 Drawing Sheets

U.S. PATENT DOCUMENTS

| | | |
|---|---|---|
| 4,692,706 | 9/1987 | Mazzagatti et al. . |
| 4,730,161 | 3/1988 | Cox et al. . |
| 4,766,384 | 8/1988 | Kleinberg et al. . |
| 4,785,247 | 11/1988 | Meador et al. . |
| 4,899,112 | 2/1990 | Clark et al. . |
| 4,968,940 | 11/1990 | Clark et al. ............................. 324/338 |
| 5,081,419 | 1/1992 | Meador et al. . |
| 5,210,495 | 5/1993 | Hapashy et al. . |
| 5,278,507 | 1/1994 | Bartel et al. . |
| 5,345,179 | 9/1994 | Habashy et al. . |
| 5,361,239 | 11/1994 | Zoeller . |
| 5,389,881 | 2/1995 | Bittar et al. . |
| 5,434,507 | 7/1995 | Beren et al. . |
| 5,594,343 | 1/1997 | Clark . |

OTHER PUBLICATIONS

Morse, P. and Feshbach, H., *Methods of Theoretical Physics*, McGraw–Hill, New York, 1953, pp. 896–997.

Kong, Jin Au, *Electromagnetic Wave Theory*, Wiley–Interscience, 1986, pp. 120–182.

Clark, B. et al., "A Dual Depth Resistivity Measurement for FEWD", SPWLA 29th Annual Logging Symposium (Jun. 5–8, 1988), Paper A.

Clark, B. et al., "Electromagnetic Propagation Logging While Drilling: Theory and Experiment", SPE Paper 18117 presented at 63rd Annual Technical Conference and Exhibition, Houston, Texas, Oct.2–5, 1988.

Golub and Van Loan, *Matrix Computations*, John Hopkins University Press, (1985), pp. 16–20.

Bonner, S. et al., "New 2–MHz Multiarray Borehole–Compensated Resistivity Tool Developed for MWD in Slim Holes," SPE Paper 30547, presented at SPE Annual Technical Conference & Exhibition in Dallas, Texas, Oct. 22–25, 1995.

Carnahan, B. et al., *Applied Numerical Methods*, John Wiley & Sons (1969), p. 319–320.

Press, W.H. et al., *Numerical Recipes*, Cambridge University Press (1987), pp. 289–293.

WELL LOGGING APPARATUS AND METHOD FOR DETERMINING PROPERTIES OF EARTH FORMATIONS THAT HAVE BEEN INVADED BY BOREHOLE FLUID

ROSS-REFERENCE TO RELATED APPLICATIONS

This is a continuation-in-part of U.S. patent application Ser. No. 08/789,902, filed Jan. 29, 1997, which, in turn, claims priority from U.S. Provisional Application Ser. No. 60/011,275, filed Feb. 7, 1996. The present Application also claims priority from U.S. Provisional Application Ser. No. 60/017,956, filed May 20, 1996. The U.S. patent application Ser. No. 08/789,902 and the U.S. Provisional Application Ser. No. 60/017,956 are both incorporated herein by reference.

BACKGROUND OF THE INVENTION

1. Field of the Invention

This invention relates to the field of well logging and, more particularly, to well logging techniques and apparatus for determining formation properties, including properties of the zone invaded by formation fluids and of the uninvaded formations. The invention has general application in the well logging art, but is especially useful in logging-while-drilling.

2. Description of the Related Art

A commonly used technique for evaluating formations surrounding an earth borehole is resistivity logging. Porous formations having high resistivity generally indicate the presence of hydrocarbons, while porous formations with low resistivity are generally water saturated. However, the region immediately surrounding the borehole can be invaded by borehole fluid or mud filtrate and have a different resistivity than the virgin formation. If a resistivity logging device has only one radial depth of investigation, there is limited ability to measure the resistivity of all zones of interest, and there may be difficulty in determining if the measured resistivity represents the invaded zone, the virgin zone, or some combination of the two zones. However, if the resistivity logging device has multiple radial depths of investigation, there is greater flexibility. In addition to the advantage of having, for example, a shallow measurement and a deep measurement individually, the combination of the two can provide additional information such as the extent of invasion. It is also possible to combine two or more measurements, for example a shallow measurement and a deeper measurement, to compute a better estimate of the true formation resistivity. Another related factor, to be discussed further below, is the effect of the borehole itself on measurements.

Wireline resistivity logging tools have long been provided with two or more radial depths of investigation. Conventional wireline resistivity logging tools typically achieve two depths of investigation by using a short and a long vertical array of electrodes or coils. In general, a long vertical array provides a greater radial depth of investigation than does a short vertical array. More recently, as will be discussed momentarily, logging-while-drilling tools have been provided with multiple radial depths of investigation.

A type of well logging which is of interest herein is so-called electromagnetic propagation logging, which can be used to measure the resistivity of the formation surrounding a borehole. For example, U.S. Pat. No. 3,551,797 describes a technique wherein electromagnetic energy is transmitted into the formation, and energy which returns to the borehole is measured at a receiver pair to determine the attenuation and/or the phase shift of the electromagnetic energy propagating in the formation. More than one vertical spacing between a transmitter and different receiver pairs may be used to obtain different radial depths of investigation. For example, a receiver pair relatively close to the transmitter can be used to obtain attenuation and/or phase shift information from which the properties of the invaded zone are determined, and measurements of the attenuation and/or phase shift from a receiver pair relatively far from the transmitter can be used to obtain the properties of the deeper uninvaded formations. Either attenuation or phase shift can be used to determine a bulk value of the electromagnetic skin depth for the formation, with the bulk conductivity then being determinable from the electromagnetic skin depth.

Various other techniques also exist in the art for utilizing multiple transmitters and/or receivers to investigate resistivity at different depths of investigation.

In U.S. Pat. No. 4,899,112 there is disclosed a logging apparatus for determining the resistivity of formations at two different radial depths of investigation using signals received at a single receiver pair. The resistivity of formations at a relatively shallow depth of investigation around the receiver pair is determined as a function of the phase shift measured at the receiver pair, and the resistivity of formations at a relatively deep depth of investigation around the receiver pair is determined as a function of the attenuation measured at the receiver pair. The apparatus is particularly advantageous for logging-while-drilling, where it is desirable to obtain resistivity at multiple depths of investigation while minimizing the length and complexity of the logging device. The '112 Patent also discloses a so-called borehole compensated embodiment, where the receiver pair is located between and equally spaced from, a pair of transmitting antennas that can be alternately energized. The signals received at the receiver pair can be averaged to obtain borehole compensated signals; i.e., signals from which (1) drift of electronic components, and (2) borehole rugosity, have been reduced or removed by cancellation.

U.S. Pat. No. 4,899,112 also discloses that the phase shift imbalance (the difference in phase shift for upward and downward propagating signals) and/or the attenuation imbalance (the difference in attenuation for upward and downward propagating signals) can be used in obtaining a differential borehole caliper and, in some circumstances, a borehole caliper. The '112 Patent further indicates that a mathematical model could be used to relate the phase shift imbalance and the amplitude imbalance to the change in borehole diameter, and that, for example, the specific geometry of the tool, the size and shape of the borehole, and the properties of the mud and formation can be included in the mathematical model and in a look-up table. The '112 Patent also observes that a caliper look-up table can also be generated by performing an experiment wherein the phase shift imbalance and the attenuation imbalance are measured as a tool is moved through a borehole with a stepped diameter.

One or more additional transmitters can be added to the type of logging device described in U.S. Pat. No. 4,899,112, at different spacing(s), to attain further depths of investigation. In the U.S. Pat. No. 5,594,343 there is disclosed a logging apparatus that can be utilized in logging-while-drilling, and which has three or more transmitting antennas and a pair of receiving antennas. (See also "New 2-MHZ Multiarray Borehole-Compensated Resistivity Tool Developed for MWD in Slim Holes", By S. D. Bonner, et al., SPE Paper 30547, SPE Annual Technical Conference & Exhibition, Dallas, Tex., U.S.A., Oct. 22–25 1995.) In one disclosed embodiment of the referenced '343 Patent there are five transmitters; that is, fifth, third, first, second, and fourth transmitting antennas longitudinally spaced on a logging device in the recited sequence. A pair of longitudinally spaced receiving antennas are located between the first and second transmitting antennas. The fifth, third, first, second, and fourth transmitting antennas are spaced from the midpoint between the receiver pair by fifth, third, first, second, and fourth distances, respectively, and each of the fifth, third, first, second, and fourth distances are different. The transmitting antennas can be individually energized, and the configuration can provide the advantages of borehole compensation without the need for having, for each transmitter-to-receiver pair spacing, an "equal and opposite" transmitter with the same spacing on the other side of the receiver pair.

The geometry of the borehole and the properties of the borehole fluid (also called mud herein) can be important in the determination of formation resistivity, since correction should be made for the effect of the borehole fluid on the electromagnetic energy being used to measure formation properties. The mud resistivity can generally be measured uphole with good accuracy, but the downhole mud resistivity can be affected by various factors including temperature and mixing of the mud with formation fluids. The extent of such mixing in a given zone may or may not be estimable from local geological knowledge. The borehole geometry may also be roughly approximated from the drill bit size, but can vary substantially in different types of formations.

In wireline applications it may be practical to obtain a measure of borehole geometry with a caliper tool and/or to sample or otherwise measure downhole borehole fluid. In logging-while-drilling, however, these types of measurements are not readily available. Also, the types of computed differential caliper or computed caliper presently known could stand improvement.

In addition to the significance of information about the downhole borehole geometry and borehole fluid, it is important to obtain information about the zone of formations around the borehole that is invaded by borehole fluids, including the extent of invasion (generally called diameter of invasion) and the resistivity of the invaded zone. Determining the extent and nature of invasion right after drilling (which can become substantially different with the passage of time) is desirable, but is difficult to do accurately.

It is among the objects of the present invention to provide an improved well logging technique and apparatus, that can be used in logging-while-drilling, for determining, in addition to downhole borehole fluid resistivity and borehole diameter, the invaded zone resistivity and the diameter of invasion, as well as the uninvaded (virgin) formation resistivity of formations surrounding an earth borehole, and for generating logs thereof. It is among the further objects hereof to improve on traditional inversion techniques for determining downhole parameters.

SUMMARY OF THE INVENTION

In accordance with an embodiment of the present invention, there is disclosed a method and apparatus for determining the properties of formations surrounding an earth borehole that have been invaded by borehole fluid to form an invaded zone. Properties determined in an embodiment hereof are invaded zone resistivity (Rxo), diameter of invasion (DI), and uninvaded formation resistivity (Rt). (In the present application, any references to determination or use of resistivity are intended to generically mean conductivity as well, and vice versa. These quantities are reciprocals, and mention of one or the other herein is for convenience of description, and not intended in a limiting sense. Also, the term "diameter of invasion" is commonly used in well logging to express the size of the invaded zone in a region surrounding the borehole at a particular depth level. It will be understood that the invaded zone is typically not cylindrical or of regular shape and that the term "diameter of invasion" is used herein in the common well logging sense as providing a general indication of the extent of invasion.) A disclosed embodiment includes the following steps: (a) suspending a logging device in the borehole; (b) transmitting electromagnetic energy from a transmitter location on the logging device, and receiving the transmitted electromagnetic energy at receiver locations on the logging device for a first transmitter-to-receivers spacing associated with the transmitter and receiver locations; (c) determining, from the received electromagnetic energy, measurement characteristics associated with the first transmitter-to-receivers spacing; (d) repeating steps (b) and (c) for a plurality of further transmitter-to-receivers spacings to obtain measurement characteristics for the plurality of further transmitter-to-receivers spacings; (e) generating a model of formation of resistivity Rt with an invaded zone of resistivity Rxo and diameter of invasion DI; (f) selecting values of Rxo, DI, and Rt that would produce model measurement characteristics that substantially correspond, for each of a plurality of the transmitter-to-receiver spacings, with the actual measurement characteristics for the respective plurality of transmitter-to-receiver spacings; and (g) outputting the selected model values of at least one of Rxo, DI, and Rt.

In a preferred embodiment of the invention the measurement characteristics comprise phase shift and phase average, and these can be apparent phase shift and apparent phase average, respectively, which are derived as part of step (c). Also, in a preferred embodiment, the selecting of step (f) comprises varying trial values of Rxo, DI and Rt, and selecting a combination of trial values that produces correspondence of the model measurement characteristics and the actual measurement characteristics at the plurality of respective transmitter-to-receivers spacings. Also in this embodiment, the steps (e) and (f) include generating, for each of the transmitter-to-receivers spacings, look-up tables between Rxo, DI, Rt and the model measurement characteristics, and deriving the selected model values from the look-up tables and from the actual measurement characteristics.

Further features and advantages of the invention will become more readily apparent from the following detailed description when taken in conjunction with the accompanying drawings.

DESCRIPTION OF THE PREFERRED EMBODIMENTS

Figure 1:
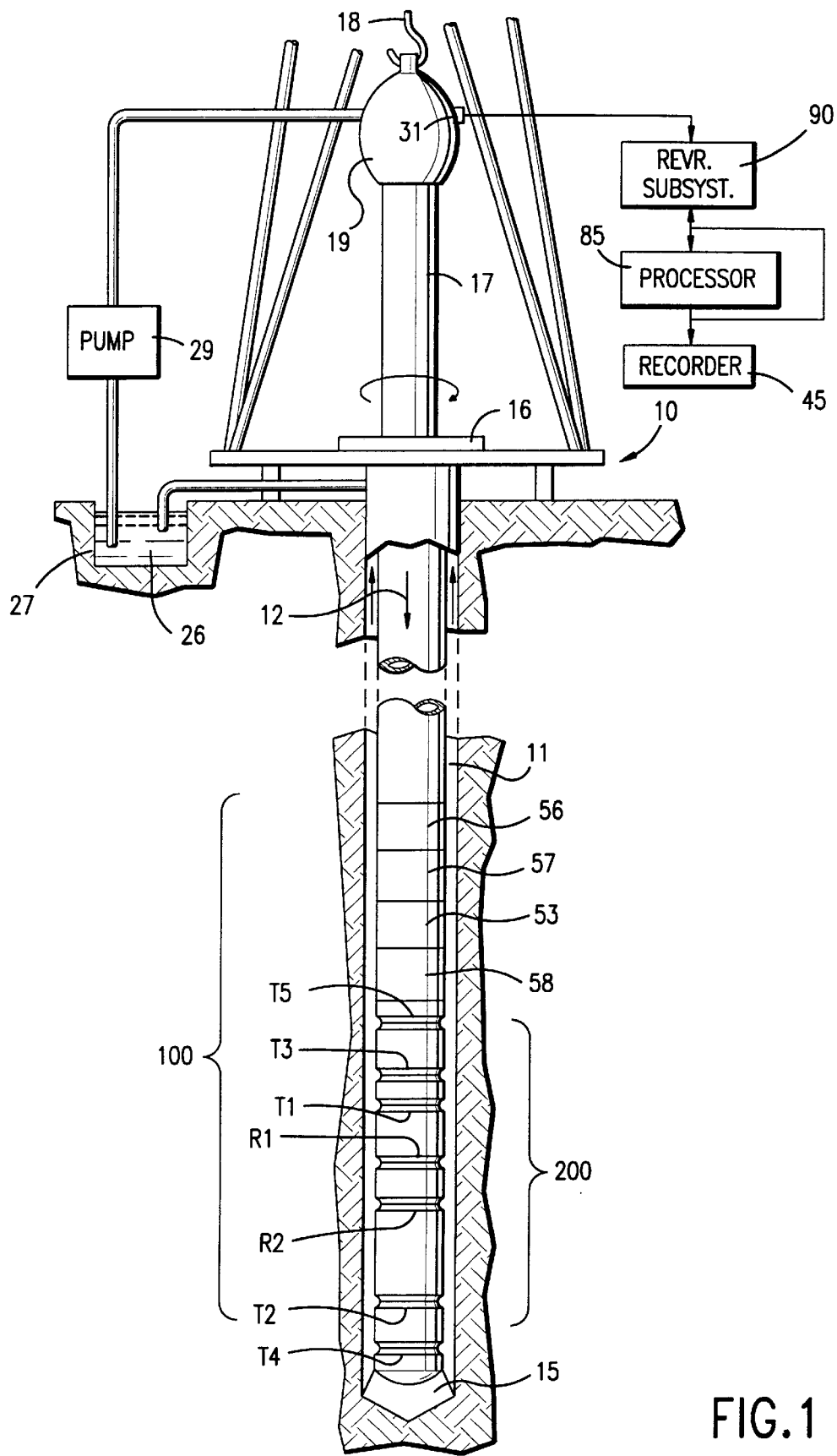
FIG. 1 is a diagram, partially in block form, of a system in which an embodiment of the invention can be employed, and which can be used to practice an embodiment of the method of the invention.

Referring to FIG. 1, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole and includes a drill bit 15 at its lower end. The drill string 12, and the drill bit 15 attached thereto, is rotated by a rotating table 16 (energized by means not shown) which engages a kelly 17 at the upper end of the drill string. The drill string 12 is suspended from a hook 18 attached to a traveling block (not shown). The kelly 17 is connected to the hook 18 through a rotary swivel 19 which permits rotation of the drill string 12 relative to the hook 18. Drilling fluid or mud 26 is contained in a pit 27 in the earth. A pump 29 pumps the drilling fluid 26 into the drill string 12 via a port in the swivel 19 to flow downward through the center of drill string 12. The drilling fluid 26 exits the drill string 12 via ports in the drill bit 15 and then circulates upward in the region between the outside of the drill string 12 and the periphery of the borehole 11. As is well known, the drilling fluid 26 thereby carries formation cuttings to the surface of the earth, and the drilling fluid 26 is returned to the pit 27 for recirculation. The small arrows in FIG. 1 illustrate the typical direction of flow of the drilling fluid 26.

Mounted within the drill string 12, preferably near the drill bit 15, is a downhole sensing, processing, storing and transmitting subsystem 100. Subsystem 100 includes a measuring apparatus 200 of the general type disclosed in U.S. Pat. No. 5,594,343 which, in the present embodiment, includes five transmitting antennas T1, T2, T3, T4 and T5 and receiving antennas R1 and R2, and operates in the manner to be described below. The antennas can be of the type described in U.S. Pat. No. 4,899,112; that is, coils wound on mounting material around a special section of metal drill collar which comprises part of the subsystem 100. A communications transmitting portion of the downhole subsystem 100 includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string 12 at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58. These electronics include a microprocessor (with associated memory, clock circuitry, and interface circuitry), and processing circuitry. The acquisition and processor electronics 58 are coupled to the measuring apparatus 200 and obtain measurement information therefrom. The acquisition and processor electronics 58 are capable of storing data from the measuring apparatus 200, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling. If desired, the drilling equipment can optionally be a directional drilling equipment (not shown) which has, for example, a bottom hole assembly that includes a stabilizer, an offset (or "bent") sub, a mud motor that is driven by the flowing mud, and a near-bit stabilizer. The bent sub typically has an offset or bend angle of ½ to 3 degrees. As is known in the art, when the bit is driven by the mud motor only (with the drill string stationary), the bit will deviate in a direction determined by the tool face direction in which the drill string and bent sub are oriented (so-called "sliding mode"). When it is desired to drill substantially straight, the drill string and the mud motor are both rotated at appropriate rates (so-called "rotating mode"). In this manner, directional drilling can be implemented with reasonable accuracy and without undue frequent tripping of the drill string.

Figure 2:
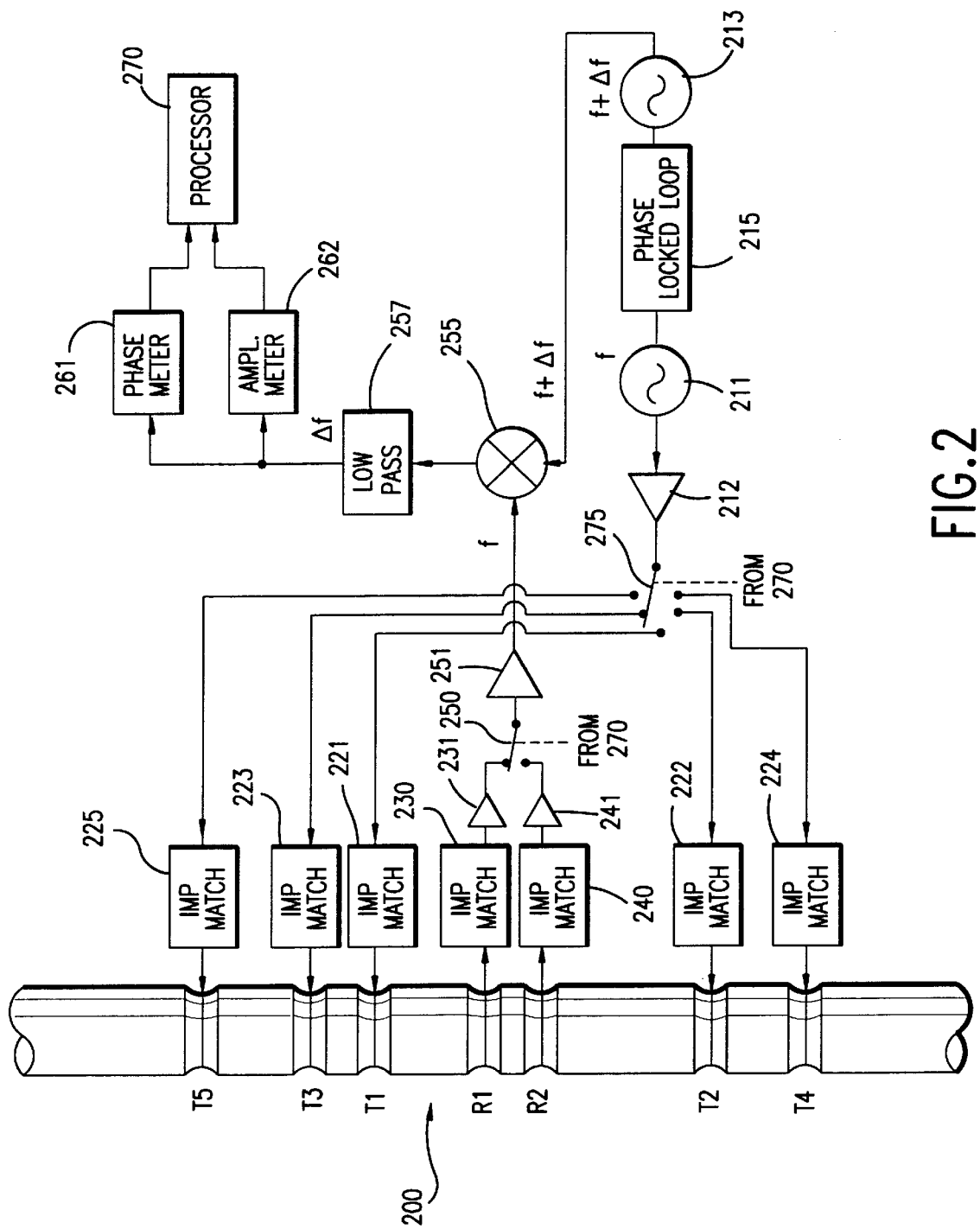
FIG. 2 is a diagram, partially in block form, of electronics in the measuring apparatus and the acquisition and processor electronics of the FIG. 1 embodiment.

FIG. 2 is a block diagram of electronics in the measuring apparatus 200 and the acquisition and processor electronics 58. An oscillator 211 produces an electrical signal of frequency f (e.g. at 2 MHZ), which is amplified by amplifier 212 and applied, via electronically controlled switch 275, to one of the transmitting antennas T1, T2, T3, T4 or T5 through respective impedance matching circuits 221, 222, 223, 224, and 225. The switch 275, under control of the processor 270, selects the transmitter T1, T2, T3, T4 or T5 that is to be energized. The signal from receiver R1 is coupled, via impedance matching circuit 230 and preamplifier 231, to one input of an electronically controlled switch 250. Similarly, the signal from receiver R2 is coupled via impedance matching circuit 240 and preamplifier 241 to the other input of the switch 250. The switch 250, under control of processor 270, selects the (R1) or (R2) receiver output. The selected signal is amplified by amplifier 251 and subsequently translated to a lower frequency $\Delta f$ using a known heterodyne technique. A local oscillator 213 is in a phase locked loop (represented at 215) with the master oscillator 211. The local oscillator 213 has a frequency $f+\Delta f$, where $\Delta f$ is typically a few kilohertz or less. A signal from the local oscillator is mixed with the received signal by a mixer 255, and the mixer output is passed through a low pass filter 257 which blocks signals at $f$ and $f+\Delta f$ and passes the signal at $\Delta f$. The signal at frequency $\Delta f$ contains the phase and amplitude information of the original signal at frequency $f$. The recognized advantage of this frequency translation is that it is easier to measure the phase and amplitude at kilohertz or lower frequencies than at megahertz frequencies. The signal at frequency $\Delta f$ is measured with a phase meter 261 and with an amplitude meter 262, and the results are input to the processor 270. The phase meter 261 may utilize a reference signal from the phase locked loop 215. The phase and amplitude meters may also include sample-and-hold circuits, to implement comparison of the signal from the respective receivers. Also, the processor can compute the relative phase and amplitude (as well as phase average, as will be described) from the measurements it receives. Reference can be made to U.S. Pat. Nos. 4,185,238, 4,899,112, and 5,594,343.

As noted above, the processor 270 has associated memory clocking, and interface circuitry (not shown), as is conventional. The processor can implement storage of the measurements of phase and amplitude, processing of these measurements, storage of the results of the processing, and/or coupling of the measurements and/or processing results to the control and driving electronics 57 for transmission to the earth's surface. As is known in the art, a downhole clock can be utilized to keep track of time, which can subsequently be correlated with depth level by virtue of keeping a record of the drill string progress. (In general, depth level means longitudinal depth in the borehole.) The clock, which can typically be part of the system in conjunction with the processor 270, can be synchronized with the system before a trip downhole. Also, if desired, communication with the downhole subsystem 100, using mud pulse technology or other suitable communication means, can be utilized to convey timing synchronization and/or depth level information, as well as to communicate data in general. It will be understood that the invention can be utilized in conjunction with any suitable technique for keeping track of depth level.

As noted above, the amplitude and phase measured at a single receiver produce relatively shallow measurements and are sensitive to the near borehole media. For this reason, the basic measurements of electromagnetic propagation logging tools are usually phase shift and attenuation across a receiver pair, the differential nature of these measurements tending to cancel most of the near borehole effects, and to reduce the contribution of the borehole fluid to the measurements.

The described logging equipment provides signals from which phase shift (PS), phase average (PA), and attenuation (AD) measurements can be obtained. The selection of which measurements to be used for inversion should be determined by the sensitivity of the measurements to the model parameters. At the time of logging-while-drilling, it is expected that diameter of invasion (DI) will be small. Therefore, the set of measurements to be used for inversion is chosen to provide a higher sensitivity in the region of smaller DI values. A DI of less than 20 inches is referred to herein as being shallow invasion.

Figure 3A:
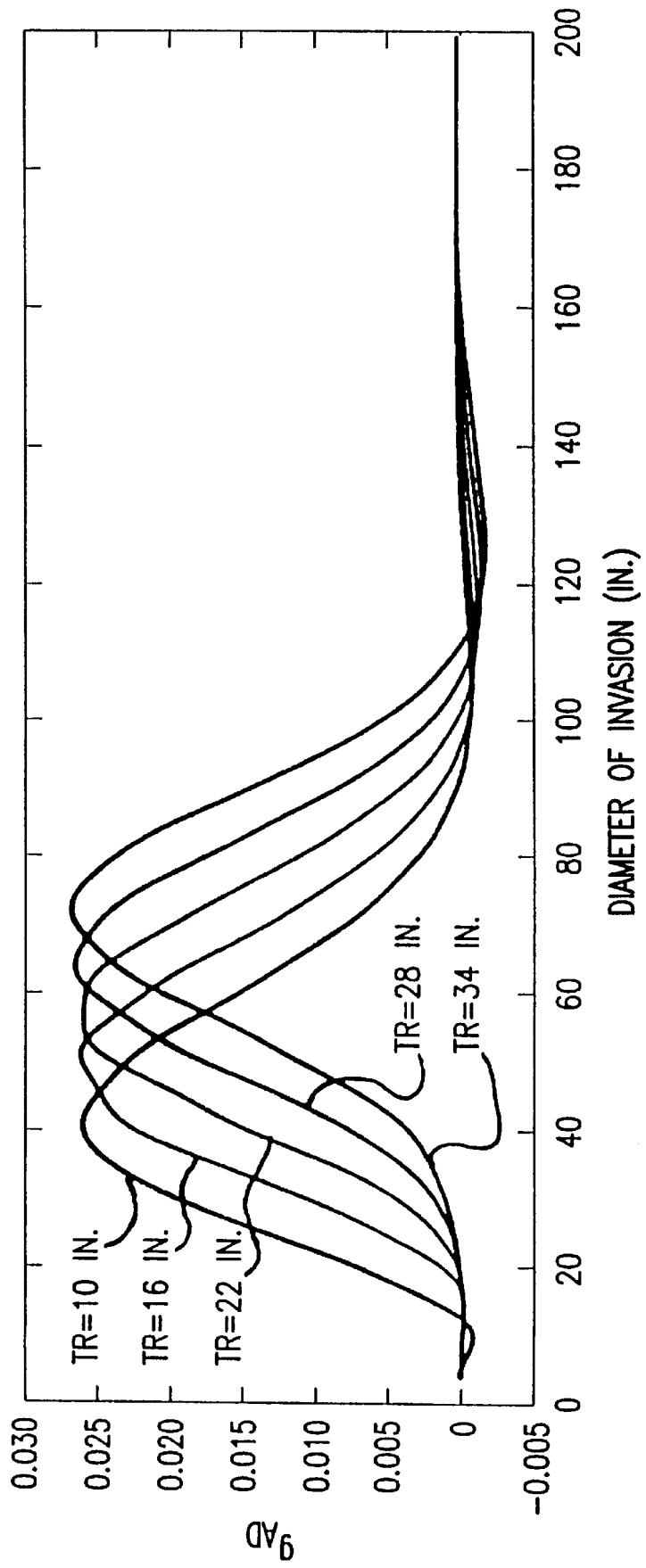
FIGS. 3A, 3B and 3C respectively show attenuation radial response, phase shift radial response and phase average radial response functions for five different transmitter-to-receivers spacings (TR).
Figure 3B:
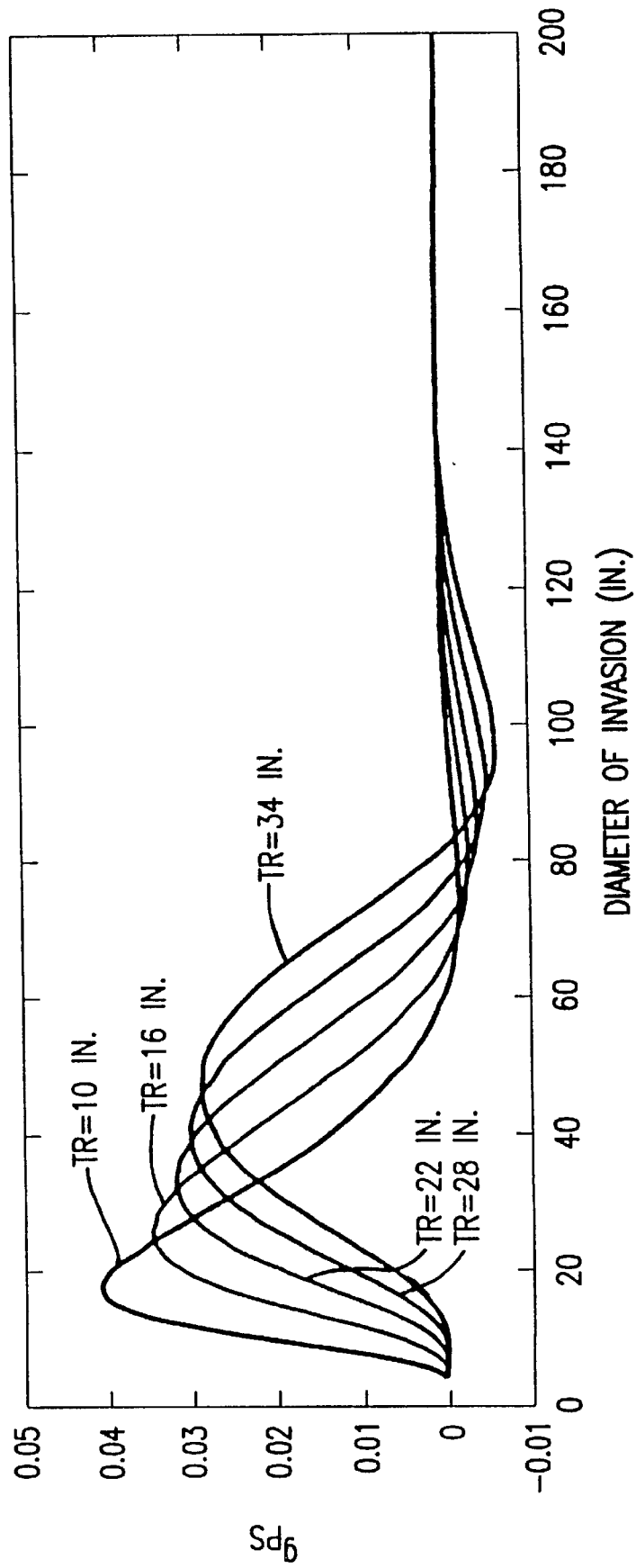
Figure 3C:
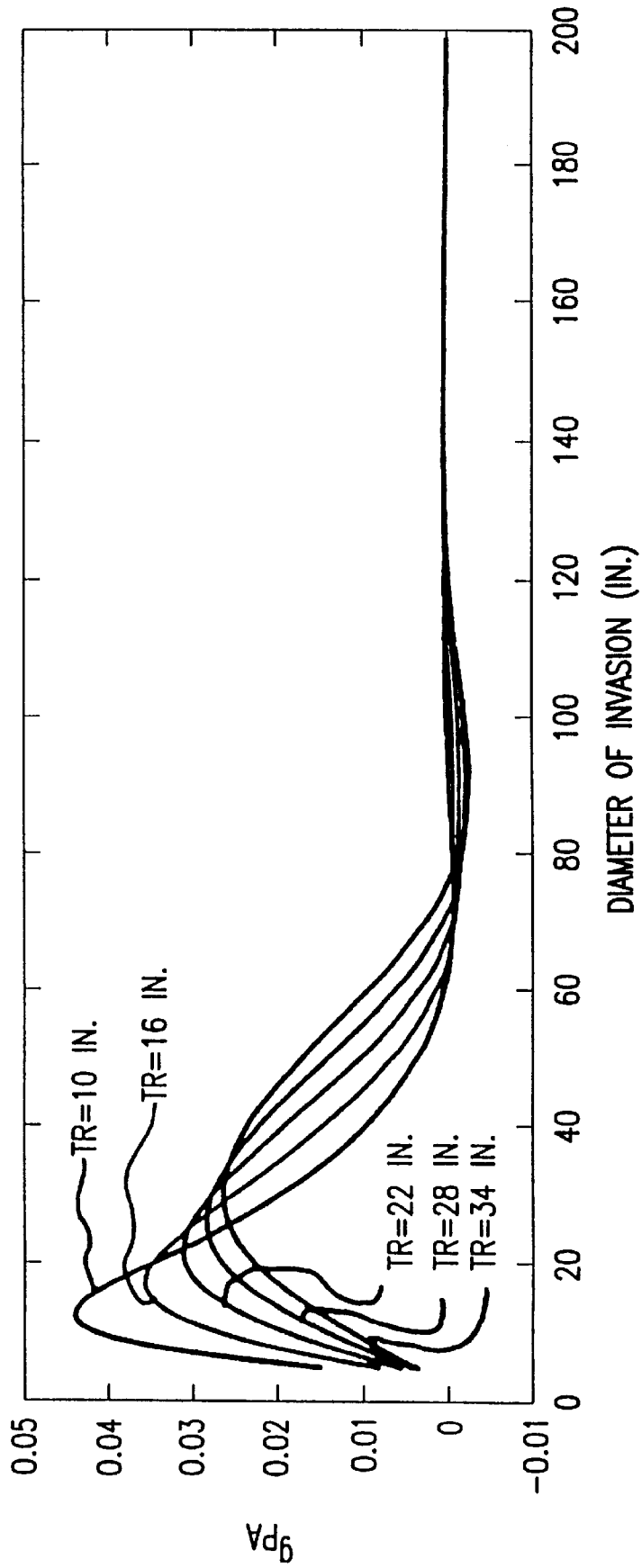

Generally speaking, AD, PS, and PA, in that order, have increased sensitivity toward near borehole formation conductivity. As an example, shown in FIGS. 3A, 3B and 3C, respectively, are plots of the radial response functions for AD, PS, and PA measurements for the described tool (in which there are a total of seven actual and computed transmitter-to-receivers spacings—see U.S. Pat. No. 5,594,343) for the case of Rxo=2 ohm-m and Rt=20 ohm-m, which represents a very common invasion condition. Five spacings are shown. The AD response to a thin cylinder of 2 ohm-m formation peaks at a diameter of invasion ranging from 40 to 80 in. for transmitter-to-receivers spacing TR=10 inches through TR=34 inches. The responses for formation within diameter of 20 inches are very small for all five TR spacings. The peak PS responses occur at diameters of invasion from 18 to 50 inches, for TR=10 inches through TR=34 inches. Other than the two shortest spacings, at TR=10 inches and TR=16 inches, the responses for formation within diameter of 20 inches are also small. On the other hand, the peak PA responses occur at diameters of invasion of less than 30 inches for all five TR spacings. For formation within the diameter of 20 inches, all five PA measurements have significant response. Thus, FIGS. 3A–3C show why the PA measurements should be utilized to enhance the resolution of the Rxo, Rt, DI inversion technique based on logging-while-drilling measurements taken at drilling time (shallow invasion).

Figure 4A:
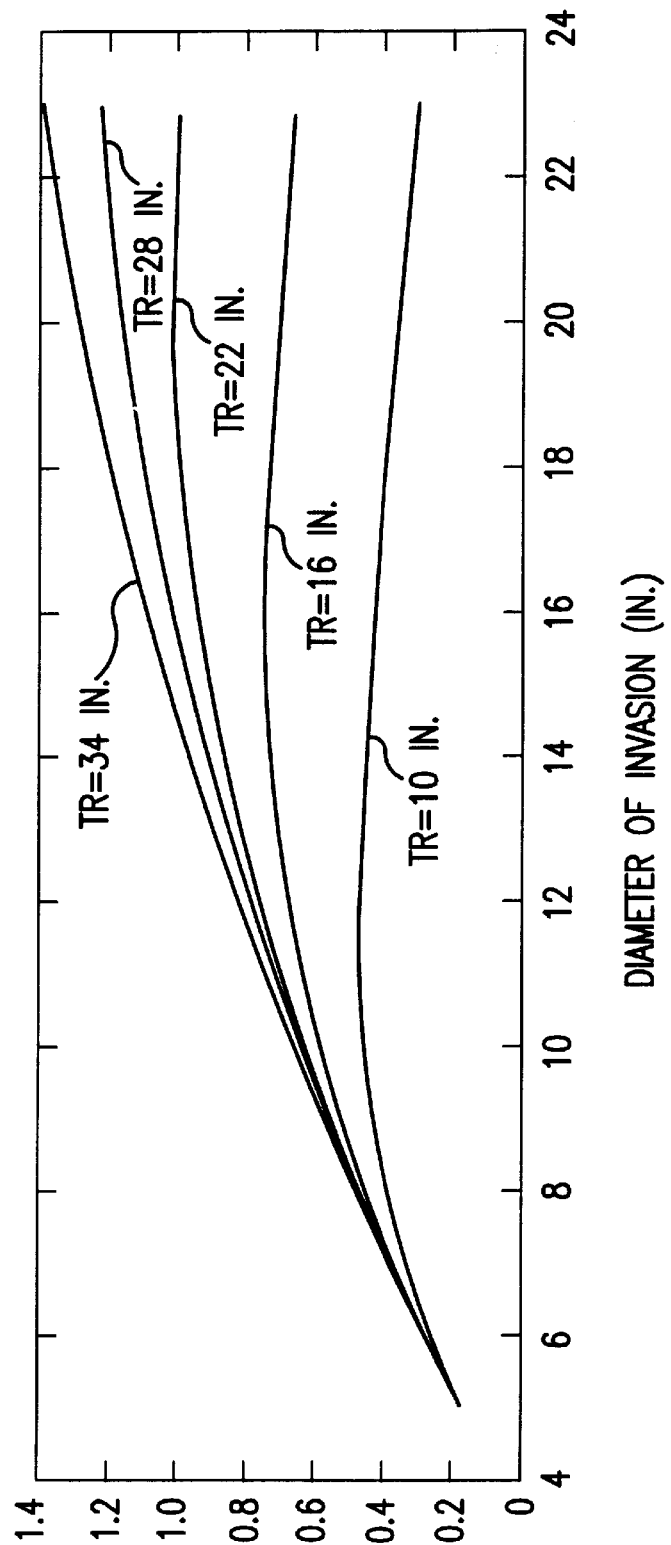
FIGS. 4A, 4B and 4C show graphs which respectively illustrate phase average sensitivities to diameter of invasion variation, phase shift sensitivities to diameter of invasion variation, and ratio of phase average sensitivities to phase shift sensitivities for five different transmitter-to-receivers spacings.
Figure 4B:
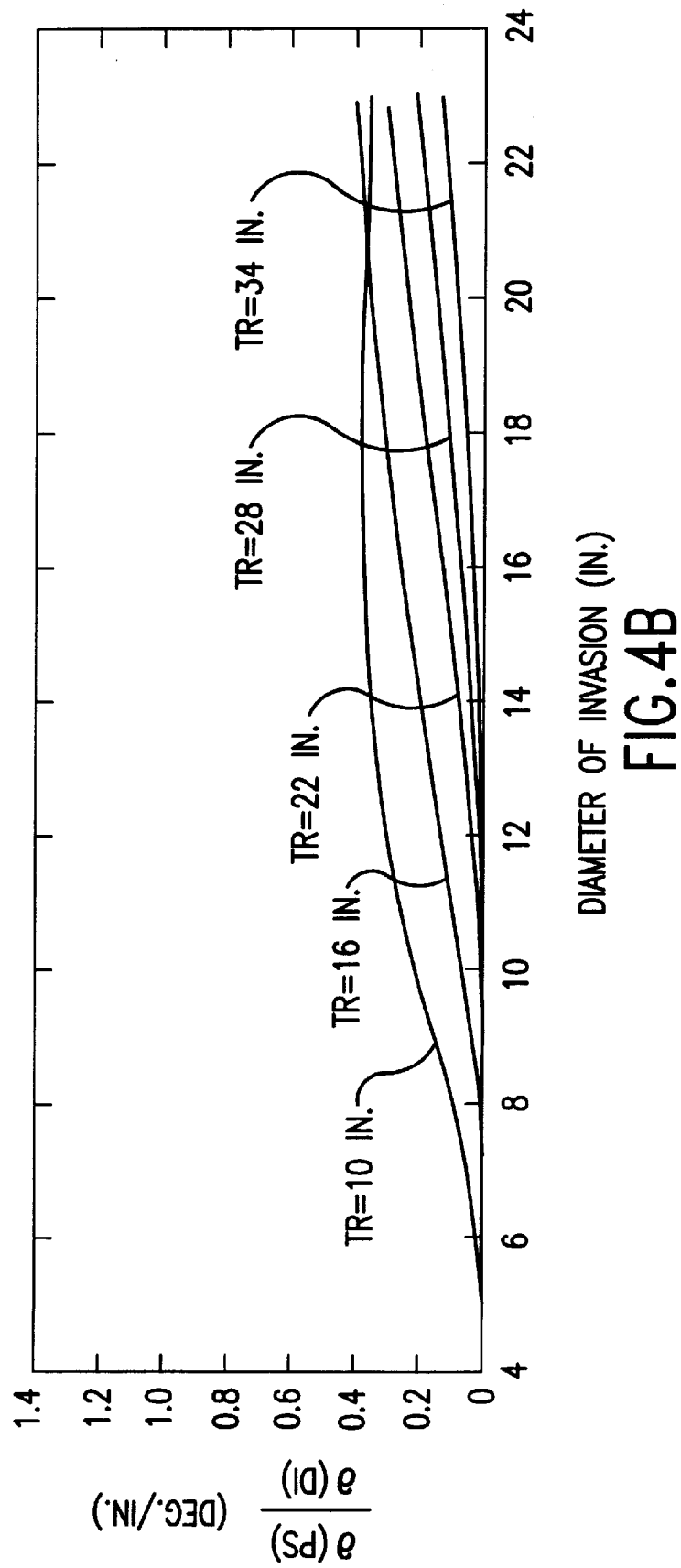
Figure 4C:
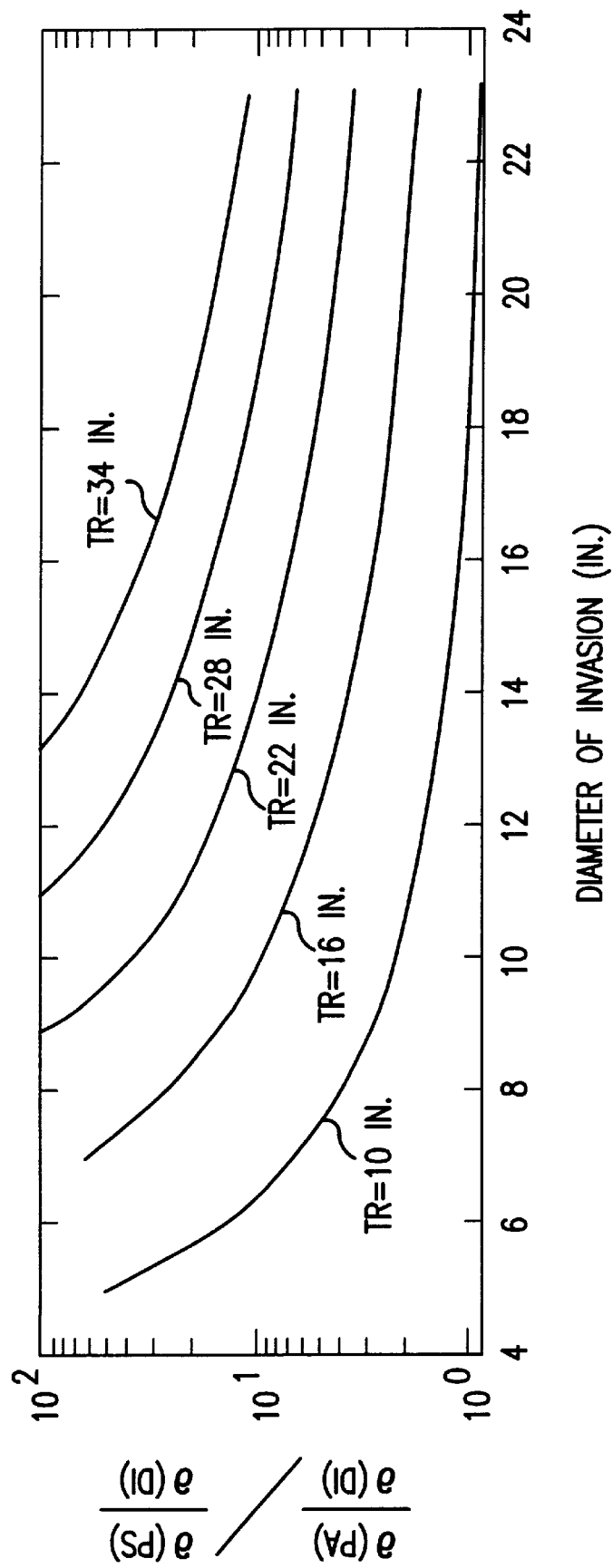

FIGS. 4A, 4B and 4C show the quantitative comparison of sensitivities to DI between PA and PS measurements for the same case of Rxo=2 ohm-m and Rt=20 ohm-m. FIGS. 4A and 4B are the partial derivatives of PA and PS, respectively, with respect to DI while keeping Rxo, and Rt constant. These partial derivatives represent the sensitivities of the variables with respect to DI. The higher the sensitivity, the better the resolution in the inversion. FIG. 4C shows the ratio of the PA sensitivities to the corresponding PS sensitivities. The sensitivities of PA measurements are in all cases better than the corresponding PS measurements for shallow invasion condition. The differences increase as TR increases and as diameter of invasion decreases. As an example, the sensitivities for the TR=34 inches PA measurements are from 10 to above 100 times higher than the corresponding PS measurements.

Figure 5A:
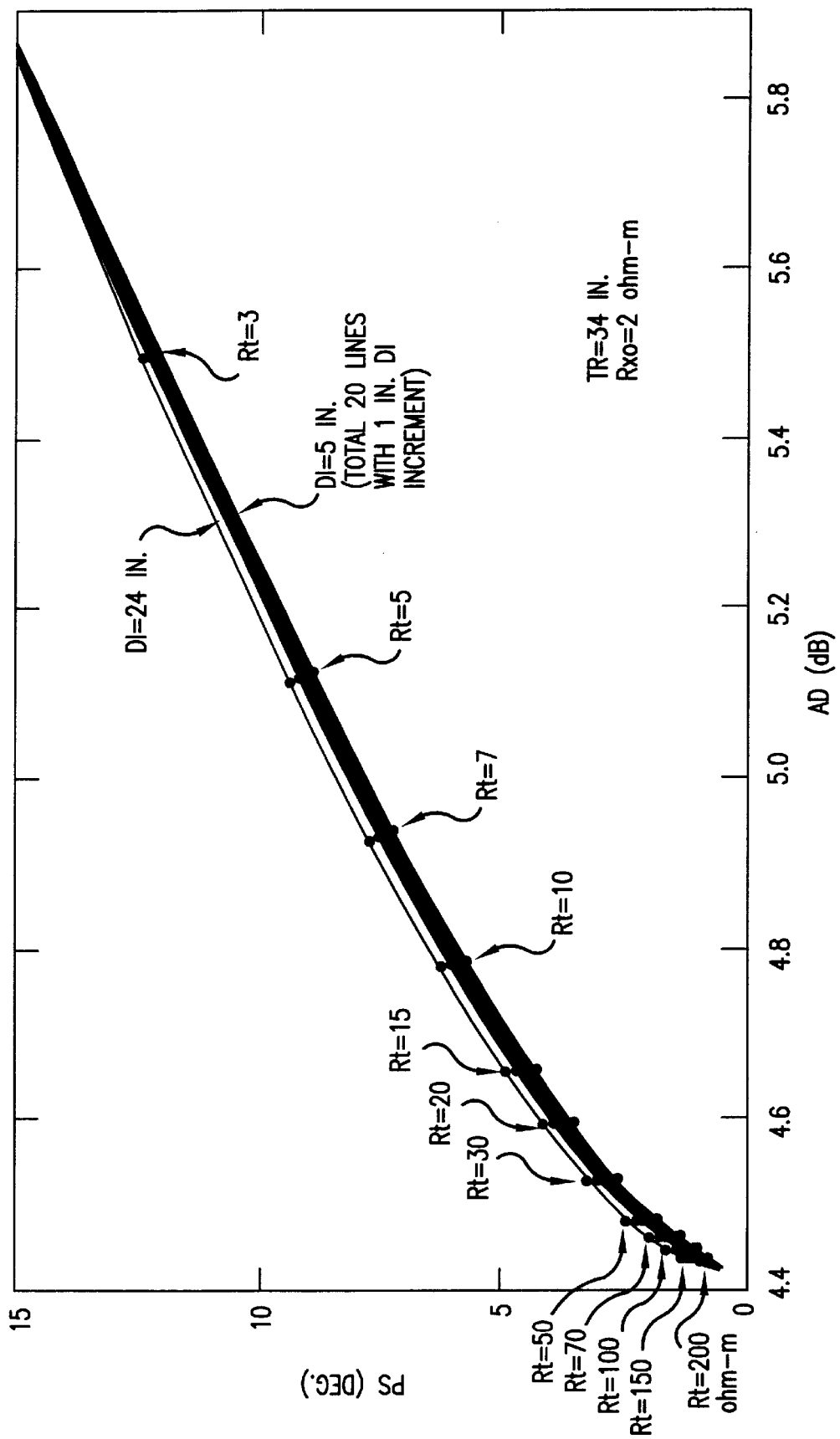
FIGS. 5A and 5B respectively show graphs of phase shift versus attenuation and phase average versus phase shift for a particular invaded zone resistivity and a particular transmitter-to-receivers spacing.
Figure 5B:
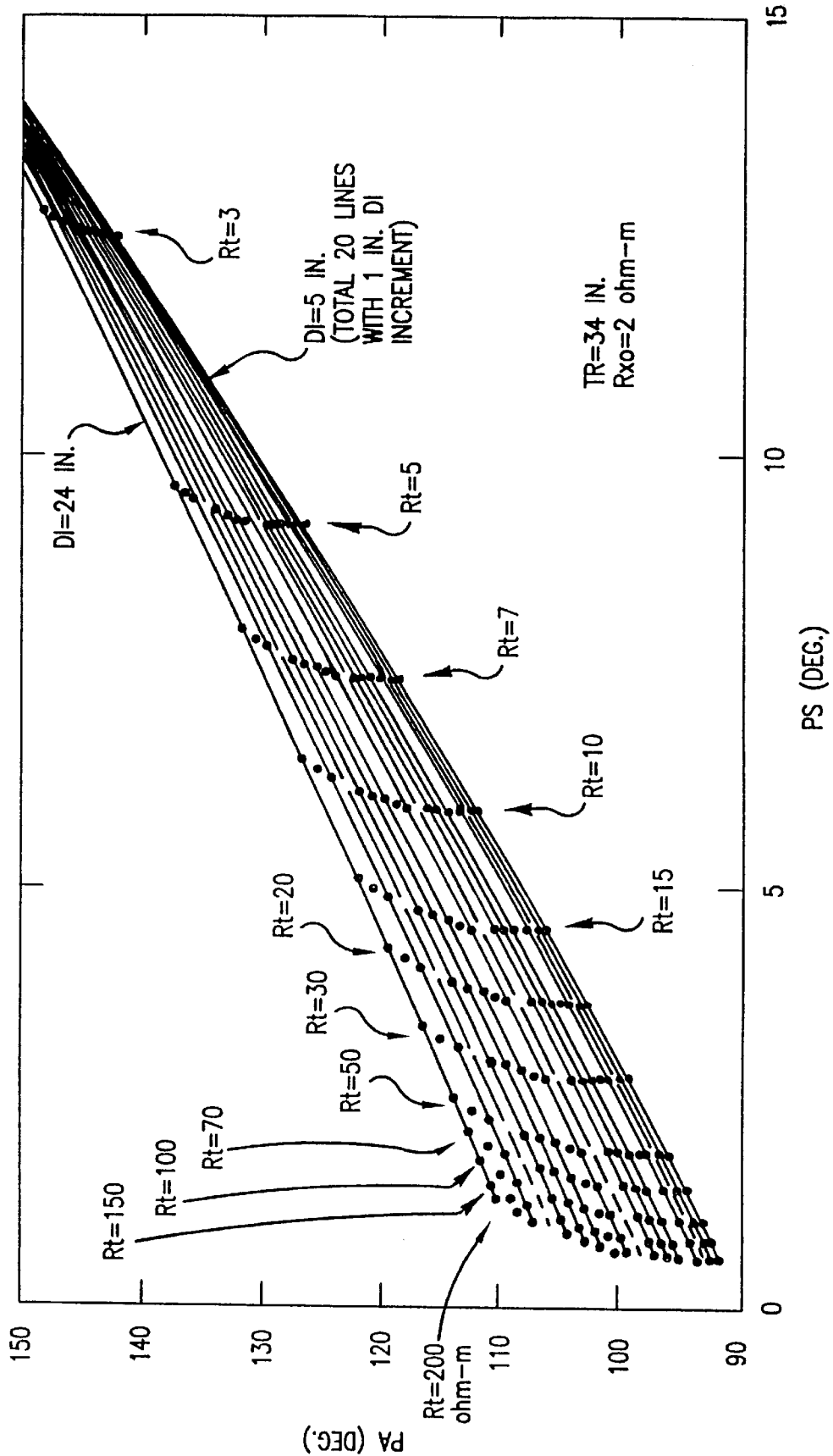
Figure 6A:
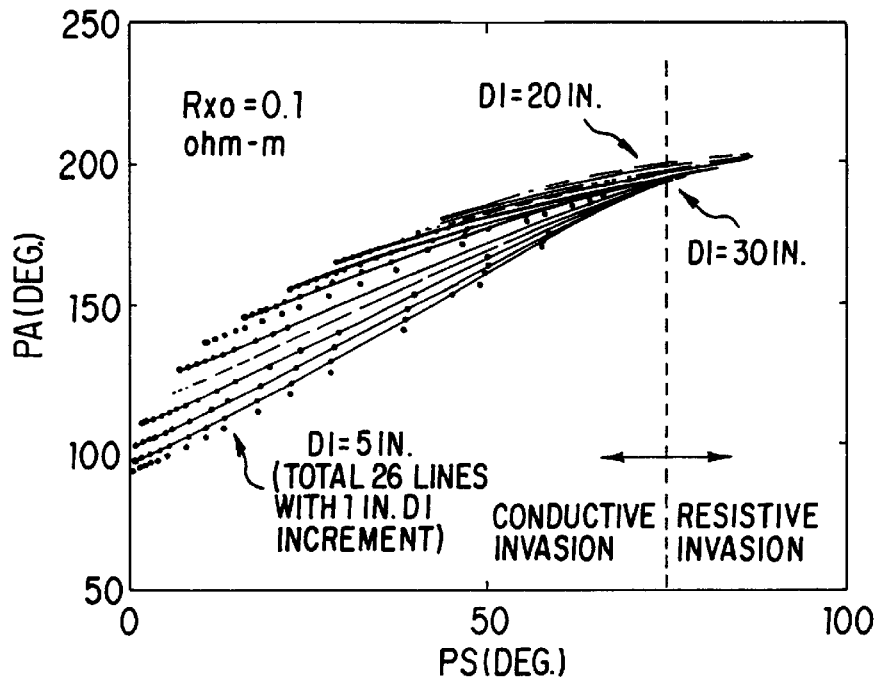
FIGS. 6A, 6B, 6C and 6D show graphs of phase average versus phase shift for different values of invaded zone resistivity and for a particular transmitter-to-receivers spacing.
Figure 6B:
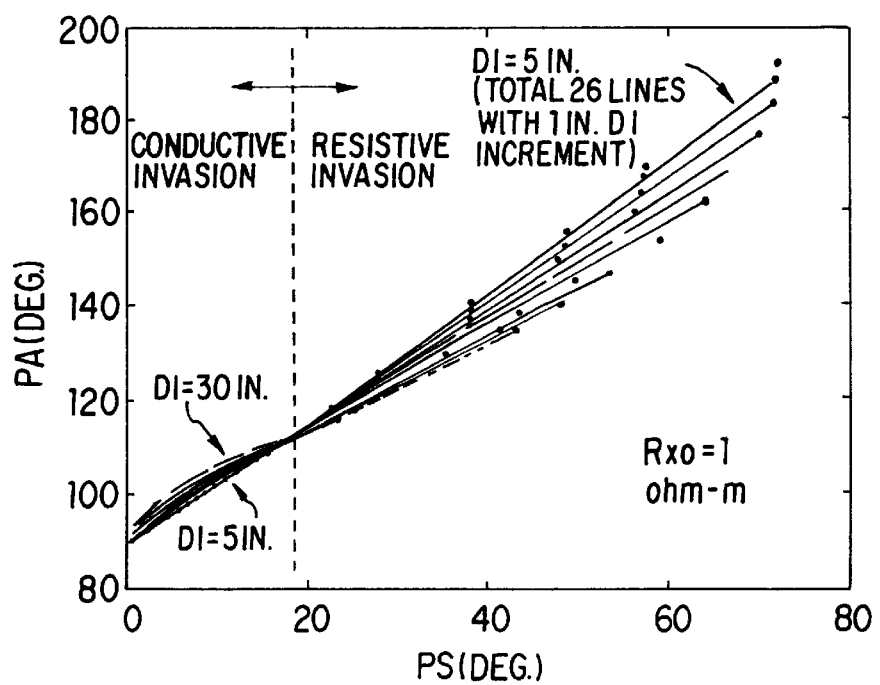
Figure 6C:
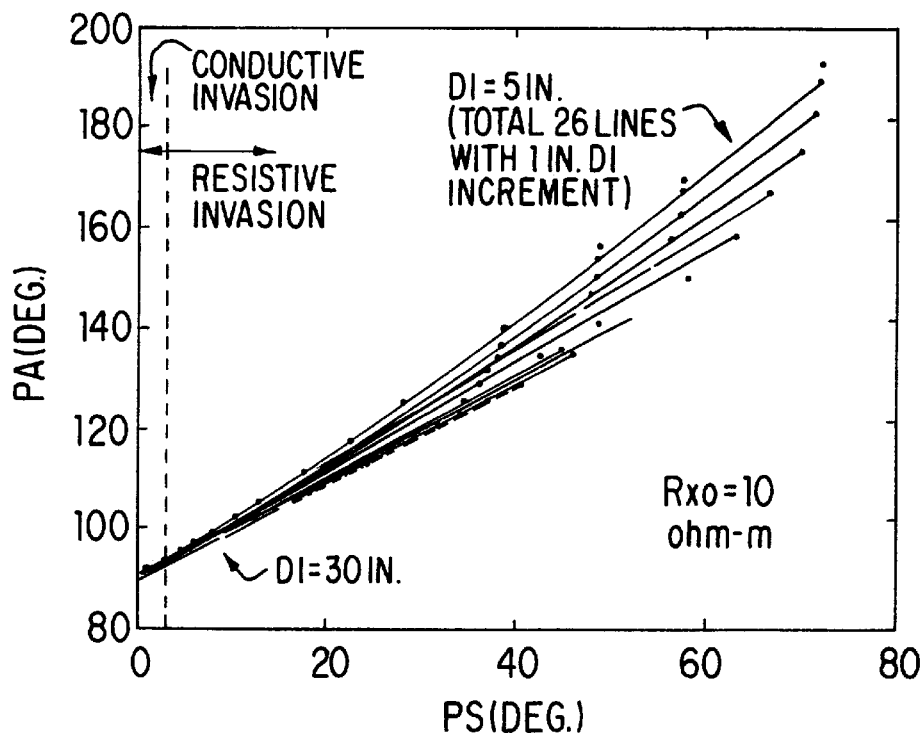
Figure 6D:
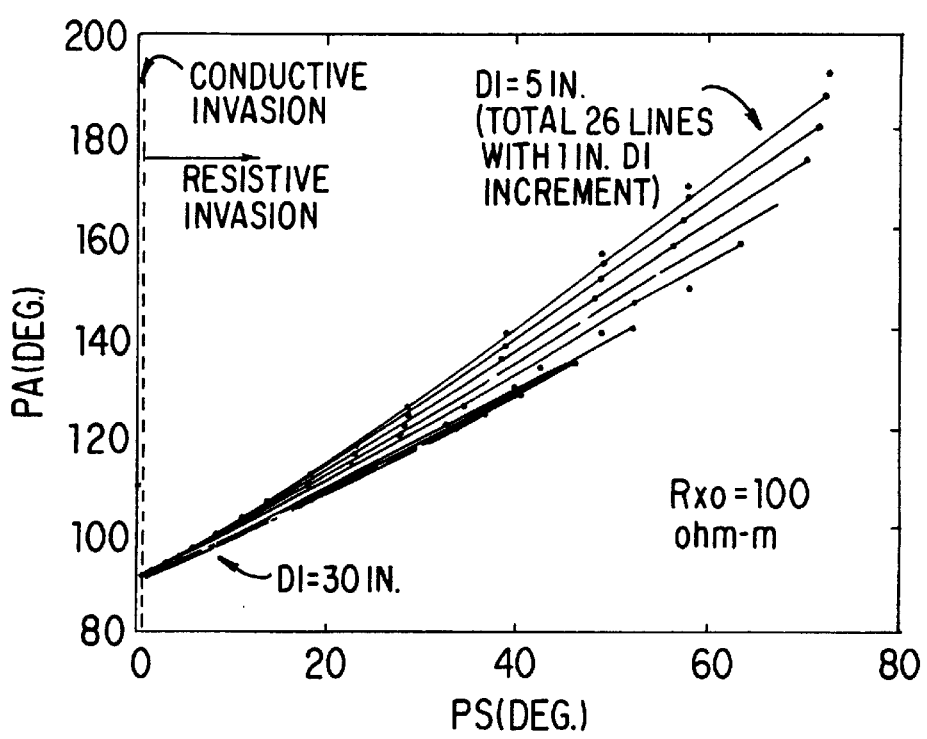

The difference just described is not limited to the Rxo=2 ohm-m, Rt=20 ohm-m condition. Rather, it occurs for all the significant invasion conditions. FIGS. 5A and 5B show the comparison between the PS versus AD and PA versus PS plots for all the cases of conducting invasion with Rxo=2 ohm-m. Using PA versus PS (FIG. 5B) the curves for different DI have consistently a 15–20 degree spread while for the case of using PS versus AD (FIG. 5A) all the curves bundled together with less than 1 degree spread. Thus, FIGS. 5A and 5B show that using PA versus PS in the Rxo, Rt, DI inversion, one can obtain a much higher resolution result than that from the traditional PS versus AD combination for shallow invasion application.

Another advantage of the PA versus PS combination is that all the measurements are from the phase which has a much more benign resistivity transform than that for attenuation. For example, FIG. 5A shows that the all the AD data points for Rt above 50 ohm-m are bundled together between 4.42 to 4.5 dB, a range of only 0.08 dB, while the corresponding data points for PS maintain a good spread of 1–2 degrees For the described logging tool with nearly matched vertical response functions from various TR spacing measurements one can approximate the two dimensional (radial and axial) inversion by a simple one-dimensional radial inversion in beds with moderate thickness.

For invasion condition, which is commonly described by a 3-layer model (mud, invaded, and virgin formation layers), a borehole correction algorithm can transform the raw phase shift measurements to those of a degenerated 2-layer model with borehole mud replaced by invaded layer material (that is, the borehole removed). Further inversion processing for Rxo, Rt and DI can then be done with a simple 2-layer model.

The model parameters Rxo, Rt and DI are discretized into nrx, nrt, and ndi discrete grid point values given as:

$Rxo(i), i=1, 2, \ldots, nrx$ $Rt(j), j=1, 2, \ldots, nrt$ $DI(k), k=1, 2, \ldots, ndi$ For each TR spacing, $RT(l), l=1, 2, \ldots, ntr$ using the 2-layer step model one can compute the phase average (PA), and phase shift (PS), and attenuation (AD) over the two receivers at all the grid points of the model parameters and obtain $PA(i, j, k, l)$ $PS(i, j, k, l)$ $AD((i, j, k, l)$ for $i=1, 2, \ldots, nrx$ $j=1, 2, \ldots, nrt$ $k=1, 2, \ldots, ndi$ $l=1, 2, \ldots, ntr$ Certain structure in these multidimensional data can be exploited for solving the Rxo, Rt, DI inversion problem. For example, shown in FIGS. 6 and 7 are plots of PS versus PA for TR=10 inch and TR=34 inch measurements, respectively, at four decades of Rxo values. The circular dots mark the grid points of Rt. Each plot contains many lines, one for each grid point value of DI. In the plots of FIGS. 6 and 7, the range of Rt and DI are [300, . . . , 0.1] ohm-m and [30, . . . , 5] in., respectively. These ranges cover most of the early invasion data domain.

Within these wide ranges, the behavior of the PS versus PA plots are very orderly. The behavior can be summarized as follows:

I. Smaller Rxo (higher conductivity) results in a bigger spread of the constant DI curves.

II. For Rt≈Rxo, all the constant DI curves bundle together (for example, Rxo=1 ohm-m plot at PS around 18 degrees). This means that the resolution for DI is extremely poor when there is a lack of contrast between Rxo and Rt. Any DI value will yield the same PS and PA measurements.

III. For Rt<Rm (mud resistivity)(on the right-hand side of the Rt=Rm dashed line), an increase in DI will cause a decrease in PA (downward spread of the constant DI curves).

IV. For Rt >Rm (on the left-hand side of the Rt=Rm dashed line), an increase in DI will cause an increase in PA (upward spread of the constant DI curves).

V. Accurate PA, PS values for arbitrary Rxo can be obtained through linear interpolation in logarithmic domain.

Figure 7A:
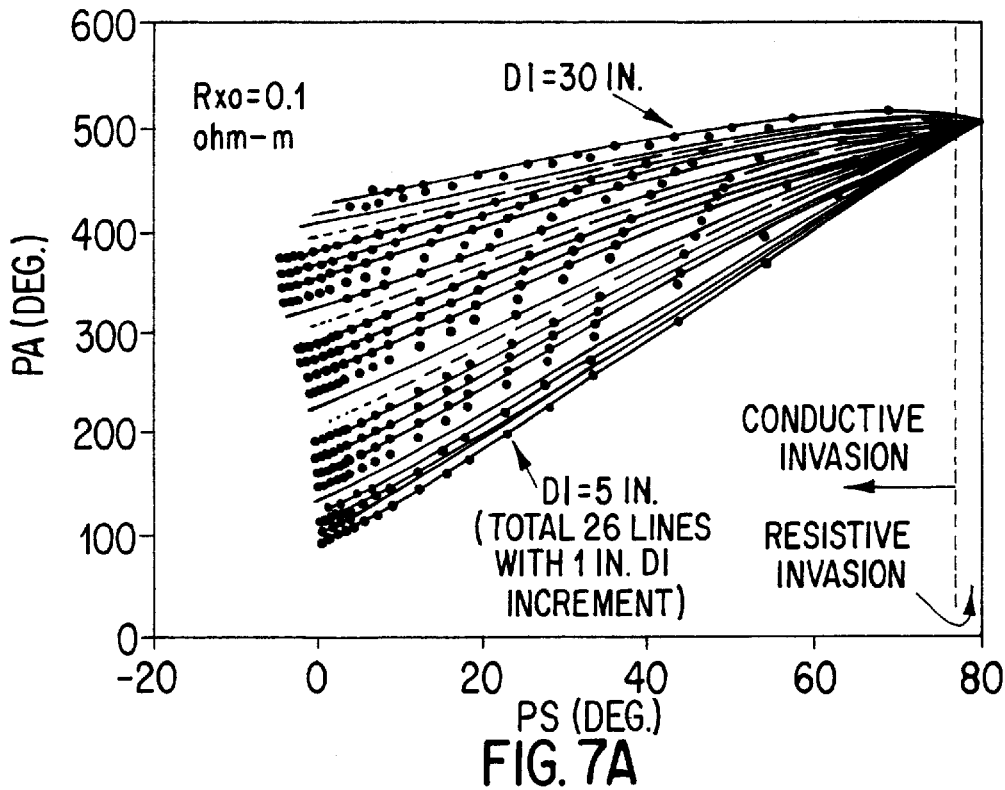
FIGS. 7A, 7B, 7C and 7D show graphs of phase average versus phase shift for different values of invaded zone resistivity and for another particular transmitter-to-receivers spacing.
Figure 7B:
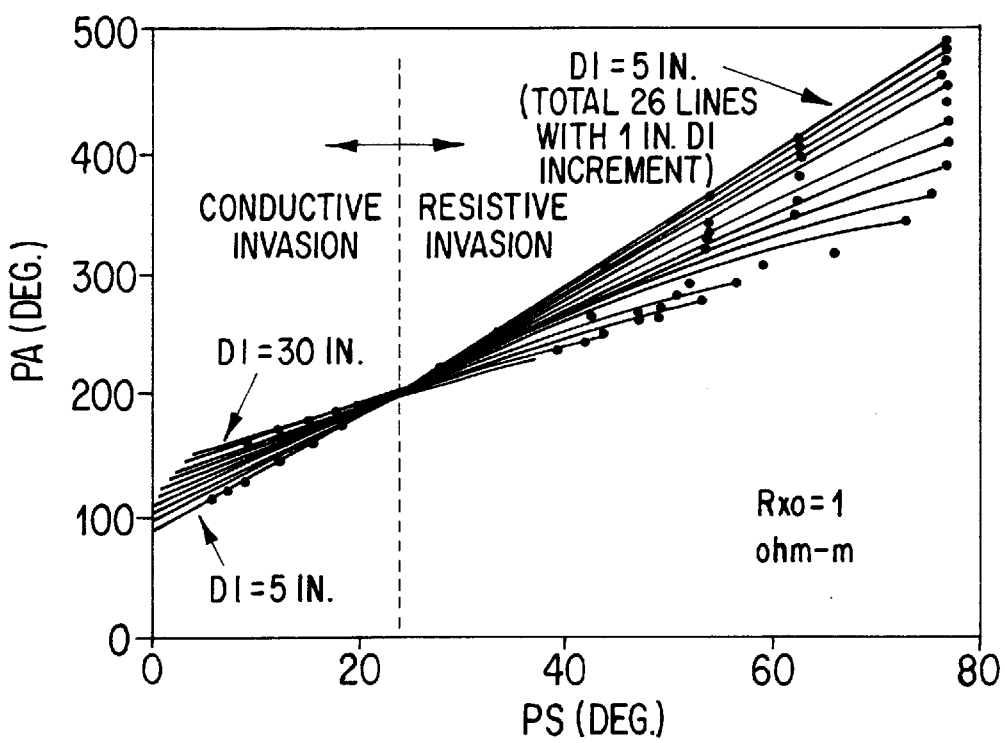
Figure 7C:
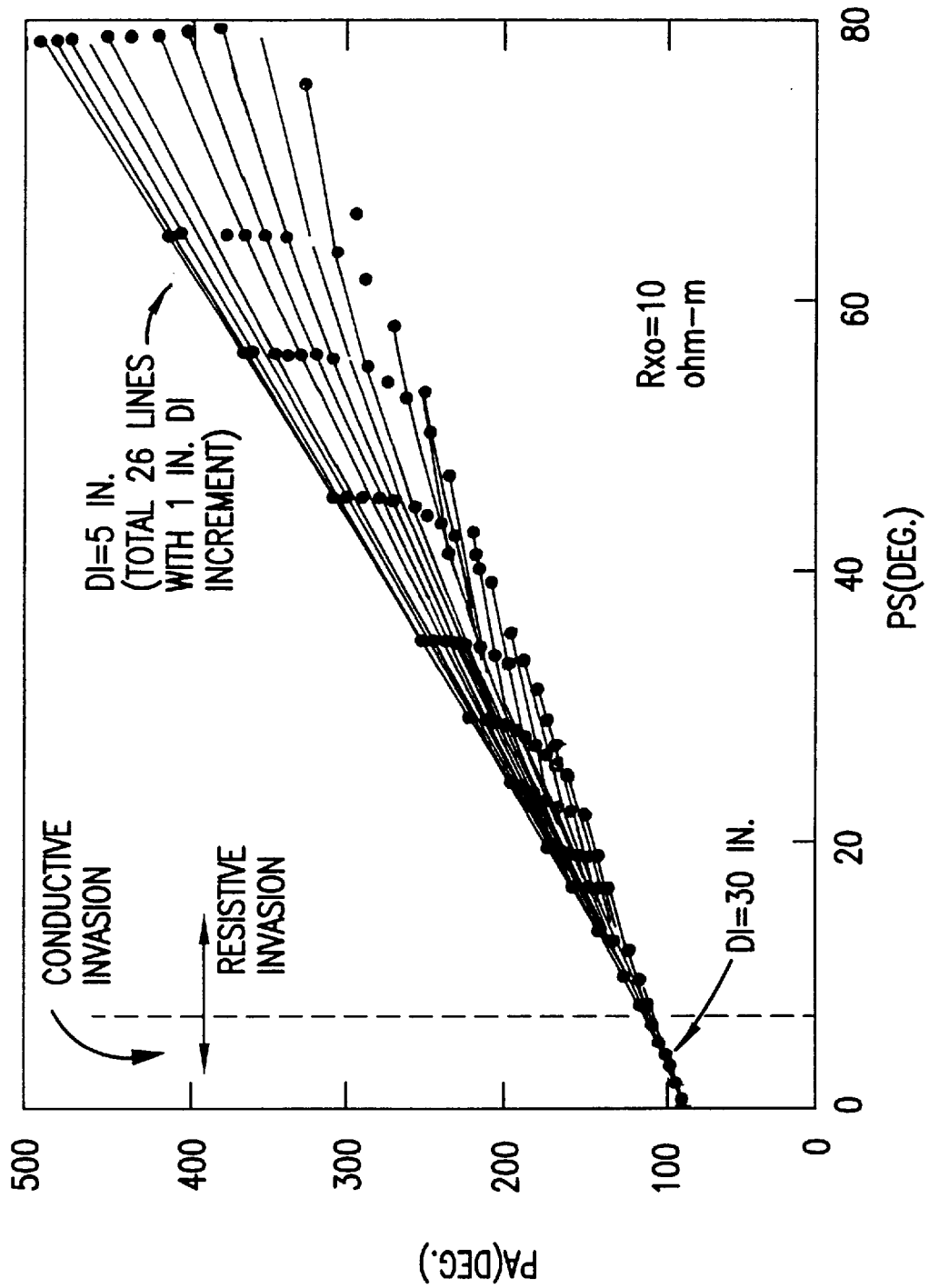
Figure 7D:
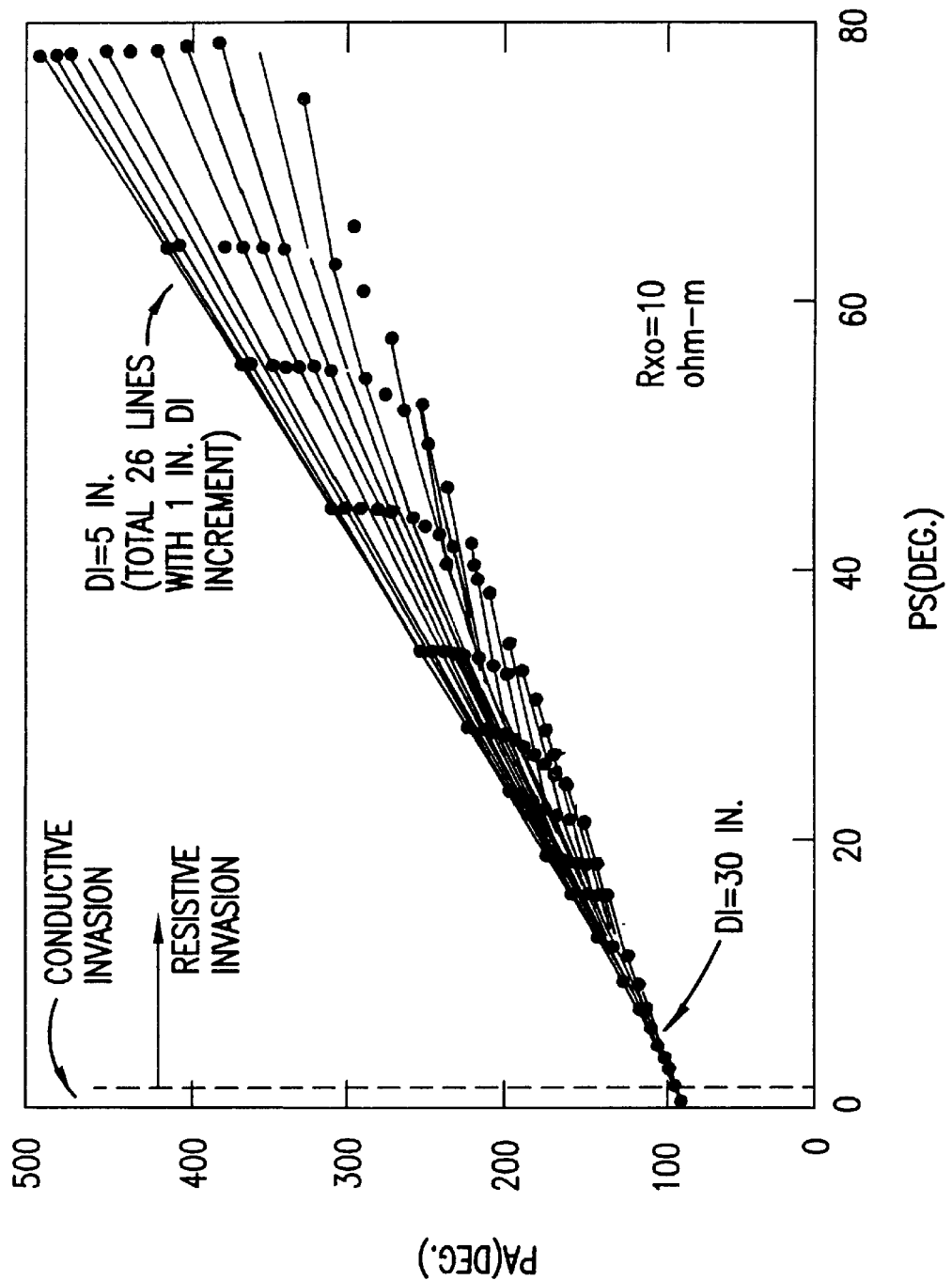

VI. For very conducting Rxo, short TR spacing, and large DI, the span of the whole constant DI curve will shrink and the center of the curve will shift rapidly toward very high PS values (see Rxo=0.1 ohm-m plot DI>20 in. curves). In this condition, almost the entire propagation path is within the Rxo layer. The formation resistivity (Rt) has very little influence on the PS and PA measurements. This would lead to a poor Rt resolution. For very large DI, a longer TR spacing measurement is needed for proper Rt inversion. This can be shown by comparing the PS versus PA plots of Rxo=0.1 ohm-m for TR=10 in. (FIG. 6A) with that for TR=34 in. (FIG. 7A).

The orderly structure of the above data suggests a very simple and quick way to do Rxo, Rt, DI inversion via interpolation. The algorithm will produce a perfect match between the measured and modeled PS and PA data. Measurement noise and/or conditions for which the measured data do not fit the 2-layer model will give rise to a spread of the model parameters, Rxo and Rt, and DI from various mixed borehole compensated spacings. The amount of spreading of model parameters can be used as quality indicators for the inversion. It is more convenient to interpret such quality indicators in the physical parameter space than the traditional least square minimization inversion cost function which is some sort of function (such as L1 or L2 norm) of the difference between measured and modeled phase shift and phase average data.

In accordance with an embodiment hereof, the process involves the following steps:

1. Transform the borehole corrected phase shift and phase average resistivities into the apparent phase shift and phase average of uniform formation model, PS_a(m,l) and PA_a (m,l), where m is the index for depth and l is the index for all the mixed borehole compensated spacings of the logging tool.

2. Drive the model with (a) a set of nrxi discretized Rxo values or (b) ndii) discretized DI values.

$$Rxoi(n)=10 \exp [\log_{10}(Rxo\_min)+(n-1)*(\log_{10}(Rxo\_max)-\log_{10}(Rxo\_min))/(nrxi-1)], n=1, 2, \ldots; nrxi$$

$$DIi(n)=DI\_min+(n-1)*(DI\_max-DI\_min)/(ndii-1), n=1, 2 \ldots, ndii$$

Here Rxo_min and Rxo_max are user input parameters for the minimum and maximum Rxo values to be considered at the zone of data for inversion and DI_min and DI_max are the minimum and maximum DI to be considered in the inversion.

Whether to drive the model with option (a) or (b) depends on the local knowledge of the data set. For example, if it is known that the diameter of invasion is going to be small and there is no information about the possible Rxo values, then it may be more convenient to drive the model with ndii discretized DI values distributed over the possible small range of DI. On the other hand, if it is known that the Rxo values will be within a certain small range, it may be better to drive the model with nrxi discretized Rxo values distributed over the possible range of Rxo.

The scheme of driving the model with discretized Rxo or DI values and the search for a minimum is presently preferred and also serves the purpose of ease of explanation of the algorithm. Without limiting generality, it will be understood that steps of the inversion technique of the disclosed embodiment can be replaced by other minization schemes such as Newton-Raphson method (see *Applied Numerical Methods* by B. Carnahan, H. A. Luther, and J. O. Wilkes, John Wiley & Sons, Inc., 1969, P. 319) or Nelder and Mead's simplex method (*see Numerical Recipes* by W. H. Press, B. P. Flannery, S. A. Teukolsky, W. T. Vetterling, Cambridge University Press, 1978, 3rd Ed., P. 289). The trade-offs between the various schemes are robustness and speed of convergence.

3. For the case of driving the model with a set of discretized Rxo values, the PS and PA values are obtained at each Rxoi value through linear interpolation in logarithmic domain for all the TR spacings and all the grid point values of Rt, DI.

$$PA\_rxoi(n,j,k,l)$$

$$PS\_rxoi(n,j,k,l),$$

$$n=1,2,\ldots, nrxi$$

$$j=1, 2, \ldots, nrt$$

$$k=1, 2, \ldots, nhd$$

$$l=1, 2, \ldots, ntr$$

4. For the case of driving the model with a set of discretized Rxo values, using the apparent phase shift, PS_a(m, l), and phase average, PA_a(m, l), and the model data PA_rxoi(n, j, k, l) and PS_rxoi(n, j, k, l), obtain through a two dimensional linear interpolation the DI and Rt values:

$$DI\_rxoi(m, n, l)$$

$$Rt\_rxoi(m, n, l)$$

$$m=1, 2, \ldots, ndepth$$

$$n=1, 2, \ldots nrxi$$

$$l=1, 2, \ldots ntr$$

5. For the case of driving the model with a set of discretized Rxo values, to determine the Rxo estimate by selecting a Rxoi(n) which yields the smallest combined spread for Rt_rxoi (m, n, l) and DI_rxoi (m, n, l), the selection rules for the present embodiment are the following: find the n=$\underline{n}$ that yields the smallest combined normalized variance over the five longest TR spacings l=3, 4, 5, 6, 7:

$$Var(Rt\_rxoi(m,\underline{n},l)/Mean(Rt\_rxoi(m,\underline{n},l)+Var(DI\_rxoi(m,\underline{n},l)/Mean(DI\_rxoi(m,\underline{n},l))$$

and that at least a minimum of four of the Rt and DI estimates, Rt_rxoi(m,$\underline{n}$,l) and DI_rxoi(m,$\underline{n}$,l) l=1, . . . , ntr are within the following preset limits:

$$4 \text{ in.}<DI\_rxoi(m,\underline{n},l)<200 \text{ in., for } l=1, \ldots, ntr$$

$$0.1 \text{ ohm-m}<Rt\_rxoi(m,\underline{n},l)<300 \text{ ohm-m, for } l=1, \ldots, ntr$$

The final inverted parameters are given as:

$$DI\_inv(m)=Mean(DI\_roxi(m,\underline{n},l)) \text{ over } l=3, 4, 5, 6, 7$$

$$Rt\_inv(m)=Mean(Rt\_roxi(m,\underline{n},l)) \text{ over } l=3, 4, 5, 6, 7$$

$$Rxo\_inv(m)=rxoi(\underline{n})$$

The percentage spread quality indicators for the inversion are given as:

The plus percentage spread for DI_inv, $$pps\_di(m)=[Max(DI\_rxoi(m,\underline{n},l))/DI\_inv(m) -1]*100\%$$

The minus percentage spread for DI_inv, $$mps\_di(m)=[Min(DI\_rxoi(m,\underline{n},l))/DI\_inv(m) -1]*100\%$$

The plus percentage spread for Rt_inv, $$pps\_rt(m)=[Max(Rt\_rxoi(m,\underline{n},l))/Rt\_inv(m) -1]*100\%$$

The minus percentage spread for Rt_inv, $$mps\_rt(m)=[Min(Rt\_rxoi(m,\underline{n},l))/Rt\_inv(m) -1]*100\%$$

Here, Var, Mean, Max, and Min are variance, mean, maximum, and minimum operator over the index l.

6. For the case of driving the model with a set of discretized DI values, obtain the PS and PA values at each DIi value through linear interpolation in logarithmic domain for all the TR spacings and all the grid point values of Rt, Rxo.

$$PA_{dii}(i,j,n,l)$$

$$PS\_dii(i,j,n,l),$$

$$i=1, 2, \ldots, nrx$$

$$j=1, 2, \ldots, nrt$$

$$n=1, 2, \ldots, ndii$$

$$l=1, 2, \ldots, ntr$$

7. For the case of driving the model with a set of discretized DI values, using the apparent phase shift, PS_a (m,l), and phase average, PA_a(m,l), and the model data PA_dii(i,j,n,l) and PS_dii(i,j,n,l), obtain through a two dimensional linear interpolation the Rxo and Rt values:

$Rxo\_dii(m,n,l)$ $Rt\_dii(m,n,l)$, $m=1, 2, \ldots, ndepth$ $n=1, 2, \ldots, ndii$ $l=1, 2, \ldots, ntr$ 8. For the case of driving the model with a set of discretized DI values, to determine the DI estimate by selecting a DIi(n) which yields the smallest combined spread for Rxo_dii(m,n,l) and Rt_dii(m,n,l), the rules for the present embodiment are the following:

find the $n=\underline{n}$ that yields the smallest combined normalized variance over the five longest TR spacings l=3, 4, 5, 6, 7:

$\text{Var}(Rt_{dii}(m,\underline{n},l))/\text{Mean}(Rt\_dii(m,\underline{n},l))+\text{Var}(Rxo\_dii(m,\underline{n},l))/\text{Mean}(Rxo\_dii(m,\underline{n},l))$ and that at least a minimum of four of the Rxo and Rt estimates, Rxo_dii(m,$\underline{n}$,l) and Rt_dii(m,$\underline{n}$,l), l=1, ..., ntr are within the preset limits:

0.1 ohm-m<$Rxo\_dii(m,\underline{n},l)$<300 ohm-m, for $l=1, \ldots, ntr$ 0.1 ohm-m<$Rt\_dii(m,\underline{n},l)$<300 ohm-m, for $l=1, \ldots, ntr$ The final inverted parameters are given as:

$Rxo\_inv(m)=\text{Mean}(DI\_dii(m,\underline{n},l))$ over $l=3, 4, 5, 6, 7$ $Rt\_inv(m)=\text{Mean}(Rt\_dii(m,\underline{n},l))$ over $l=3, 4, 5, 6, 7$ $DI\_inv(m)=DIi(\underline{n})$ The percentage spread quality indicators for the inversion are given as:

The plus percentage spread for Rxo_inv, $pps\_rxo(m)=[\text{Max}(Rxo\_dii(m,\underline{n},l))/Rxo\_inv(m) -1]*100\%$ The minus percentage spread for Rxo_inv, $mps\_rxo(m)=[\text{Min}(Rxo\_dii(m,\underline{n},l))/Rxo\_inv(m) -1]*100\%$ The plus percentage spread for Rt_inv, $pps\_rt(m)=[\text{Max}(Rt\_dii(m,\underline{n},l))/Rt\_inv(m) -1]*100\%$ The minus percentage spread for Rt_inv, $mps\_rt(m)=[\text{Min}(Rt\_dii(m,\underline{n},l))/Rt\_inv(m) -1]*100\%$ Where, Var, Mean, Max, and Min are respectively variance, mean, maximum, and minimum operator over the index l.

Referring to FIG. 8, there is shown a flow diagram of a routine which, in conjunction with the routines referred to therein, can be used in programming the processors, such a processors 85 and 270 of FIGS. 1 and 2, respectively, to implement operation in accordance with an embodiment of the invention. In the illustrative embodiment hereof, certain operations are performed and/or controlled by downhole or by uphole electronics, as the case may be, but it will be understood that the invention can be implemented with some of operations performed at different alternative locations. The block 810 represents the routine, described in further detail in conjunction with FIG. 9, for implementing the borehole logging and storage of measurements. This includes measurement of amplitude and phase at each receiver for each of the transmitter-to-receivers spacings and, in the present embodiment, also includes computation of the measured phase shift $PS_m$, the measured phase average $PA_m$, and the measured attenuation $AD_m$ (if desired), for each of the transmitter-to-receivers spacings.

The block 820 represents implementing of a setup procedure wherein certain known information and operator selected parameters can be input. Reference can be made, for example, to the copending parent application hereof, U.S. application Ser. No. 08/789,902. For example, information such as uphole mud resistivity, temperature, and bit size can be input, together with operator selected parameter limits, model increments, and other parameters which are treated further herein. Also, if desired, screening can be performed, either manually or automatically, to predetermine (e.g. with a preprocessing routine) conditions under which the technique hereof would not be used or would require modification. Examples of such conditions would be the presence of a sharp bed boundary or a zone in which there is no meaningful invasion, such as may be indicated by substantial correspondence in measurements obtained from all of the various TR spacings of the logging apparatus.

Figure 10:
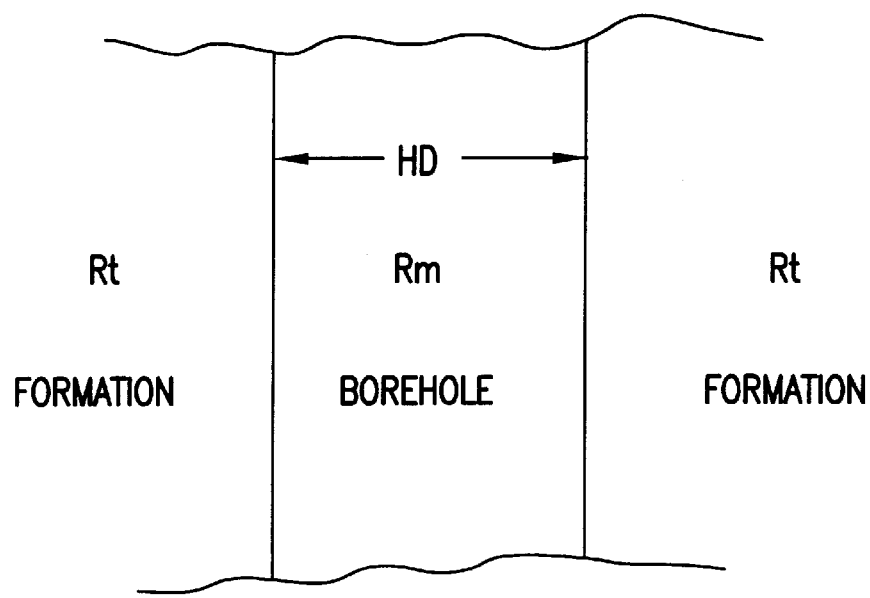
FIG. 10 is a diagram of a vertical cross-section through a cylindrical borehole which forms a step model.
Figure 11:
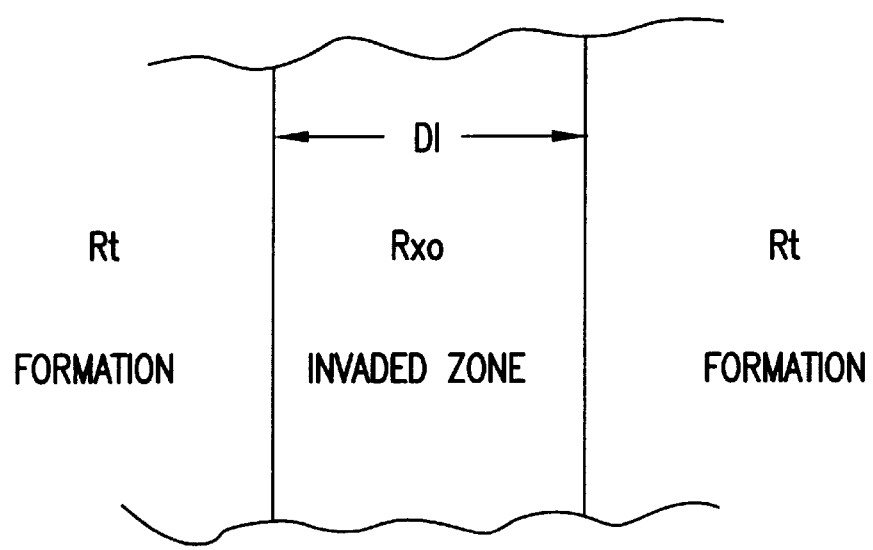
FIG. 11 is a diagram of a vertical cross-section through a cylindrical invaded zone which forms another step model.
Figure 12A:
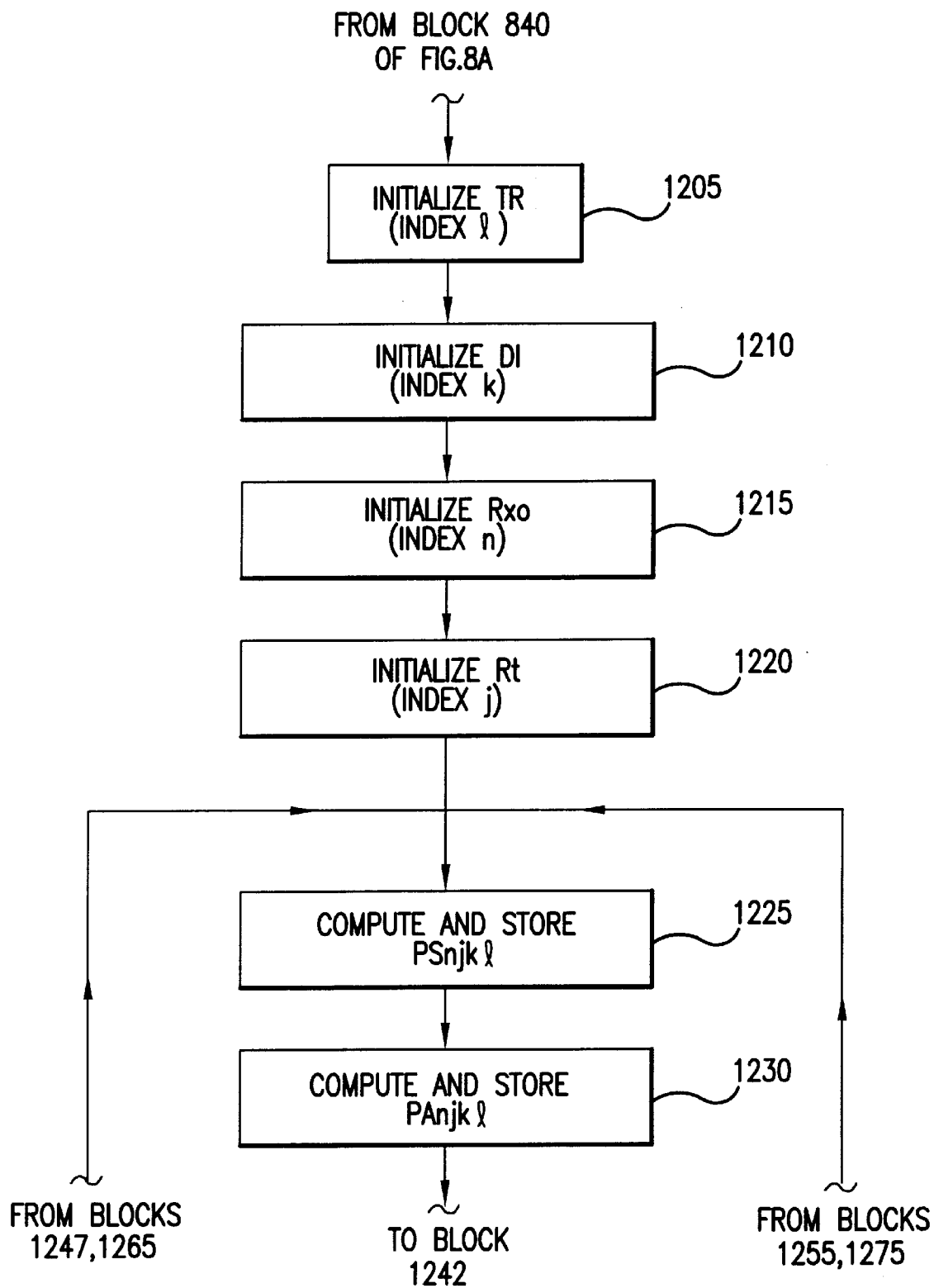
FIG. 12A, is a flow diagram of the routine, represented by the block 845 of FIG. 8A, for generating and storing a main or coarse grid look-up table used in an embodiment of the invention.
Figure 12B:
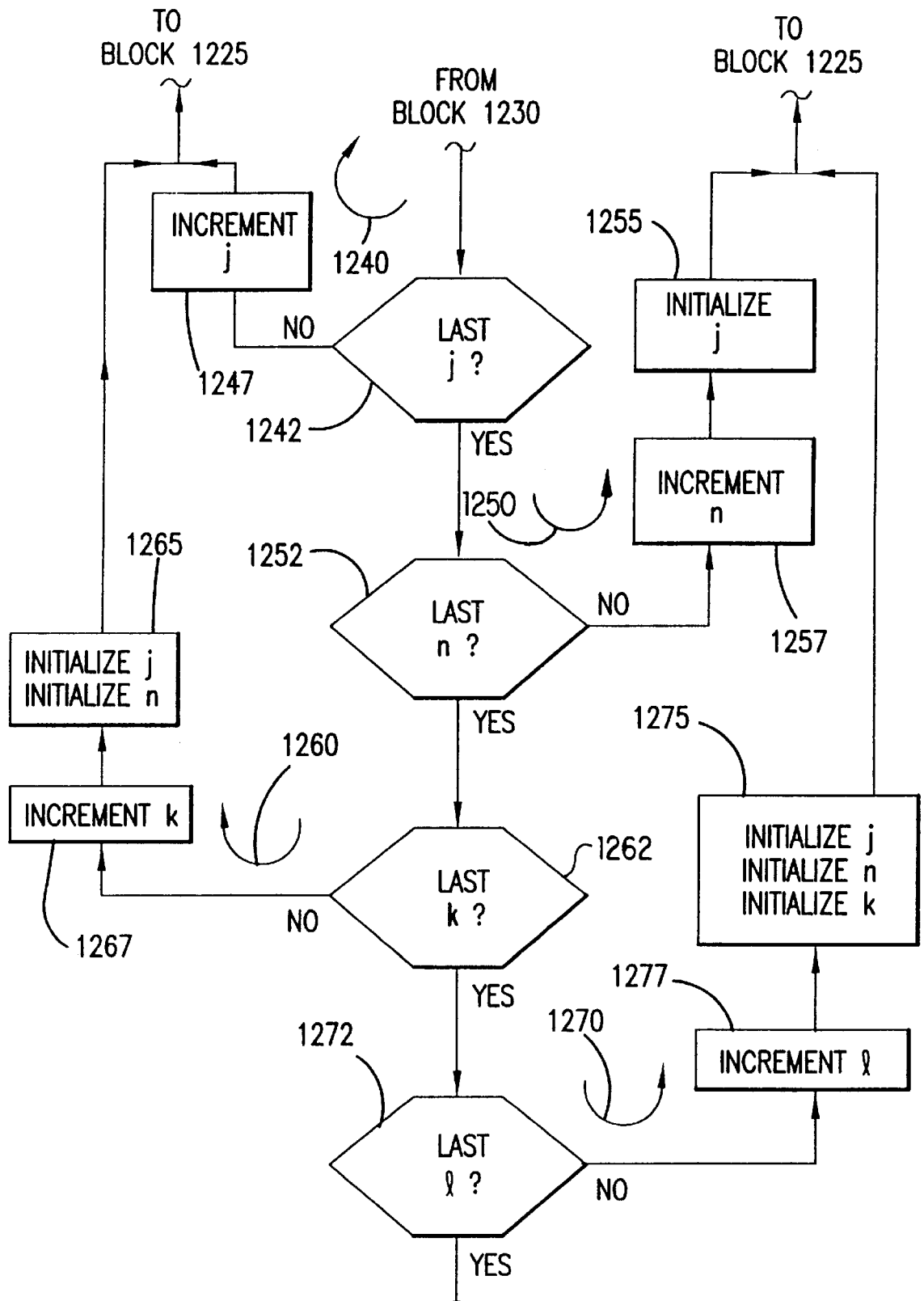
FIG. 12, which includes FIG. 12B placed below

The block 830 represents a routine from which apparent phase shift (designated PS_a) and apparent phase average (designated PA_a) values can be obtained for each depth level over the depth range of interest. In a preferred embodiment hereof, this can be done by first implementing a routine in accordance with a technique set forth in the above referenced copending parent application Ser. No. 08/789, 902 in order to obtain values for borehole-corrected resistivity obtained from phase shift ($R_{ps}$) and borehole-corrected resistivity obtained from phase average ($R_{pa}$) in the context of a simplified step model to be described momentarily (and as is collectively represented by the block 831 within block 830), and then implementing a forward modeling that employs linear interpolation in log-log domain to obtain the apparent phase shift (PS_a) and apparent phase average (PA_a) from the borehole-corrected resistivities (as represented by the block 832 within the block 830). FIG. 10 illustrates a step model used in the parent application Ser. No. 08/789,902 in conjunction with an inversion technique, the model illustrating a borehole of diameter HD filled with fluid of resistivity $R_m$ and surrounded by formation media of resistivity $R_t$. The technique of the block 831 uses measurements with a logging tool of the type described above, of phase shift (PS), phase average (PA) and attenuation (AD), and determines the apparent downhole mud resistivity $R_m$ and hole diameter HD, and can then determine the borehole corrected resistivities. From these borehole corrected resistivities, and using a further model hereof, as illustrated in FIG. 11, which illustrates a step model having an invaded zone of diameter DI containing media of resistivity Rxo, surrounded by media of resistivity Rt, one can use a suitable forward modeling technique to determine the apparent phase shift, PS_a, and the apparent phase average, PA_a, at each TR spacing of the logging apparatus. This determination is represented by the block 832. Suitable forward modeling techniques are referenced below in conjunction with FIG. 12. It will be understood, however, that the invention hereof can be practiced in conjunction with other techniques of obtaining phase shift and phase average or deriving apparent phase shift and phase average. The block 840 represents generation of the discretized values of Rxo based, for example, on operator-selected inputs for the range and increments thereof which can, in turn, be based on available knowledge. Within the range between the maximum and minimum values of Rxo, the discretized values are equally spaced in the log domain. Reference can be made to numbered Section 2. above. The next block, 845, represents the routine for generating and storing a main look-up table relating Rxo, Rt, DI, and TR to PS and PA, the routine for which is described in further detail in conjunction with the flow diagram of FIGS. 12A and 12B. This main look-up table will preferably be generated and stored beforehand, and it is only arbitrarily shown at this position in the routine. It will be called up for use, for example in implementing subsequent portions of the routine. The block 850 is then entered, this block representing initializing a depth level index to the first depth level at which the processing is to be performed in accordance with the present embodiment. Block 855 represents the determination, by interpolation in log-log domain, of model values of phase shift (PS) and phase average (PA), at each of the discretized values of Rxo, for all values of DI and Rt and at all spacings TR. This constitutes a supplemental look-up table, which can be viewed as a number of three dimensional tables, one for each discretized Rxo value (that is, one for each n). Reference can be made to the numbered Section 3. above wherein the model values are expressed as:

$$PA\_rxoi(n,j,k,l)$$

$$PS\_rxoi(n,j,k,l)$$

Two dimensional interpolation can then be employed (block 860), for each Rxo and TR combination to obtain the DI and Rt estimate values using the apparent phase shift (PS_a) and phase average (PA_a) values originally obtained for each TR spacing. Reference can be made to the numbered Section 4. above, wherein the determined outputs are designated $$DI\_rxoi(m,n,l)$$

$$Rt\_rxoi(m,n,l)$$

Figure 13A:
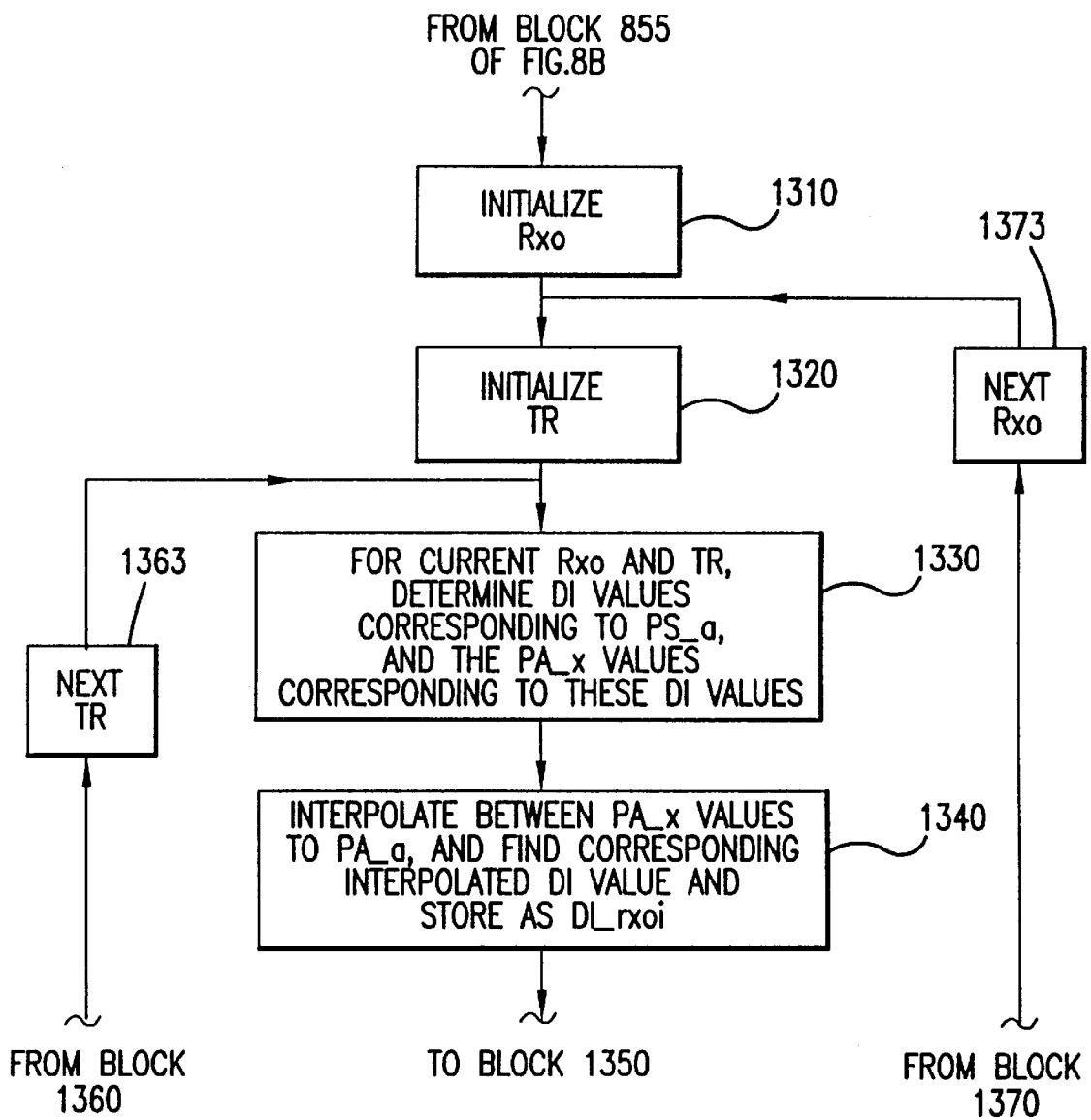
FIG. 13A, is a flow diagram of the routine, represented by the block 860 of FIG. 8B, for obtaining estimates of diameter of invasion and formation resistivity.
Figure 13B:
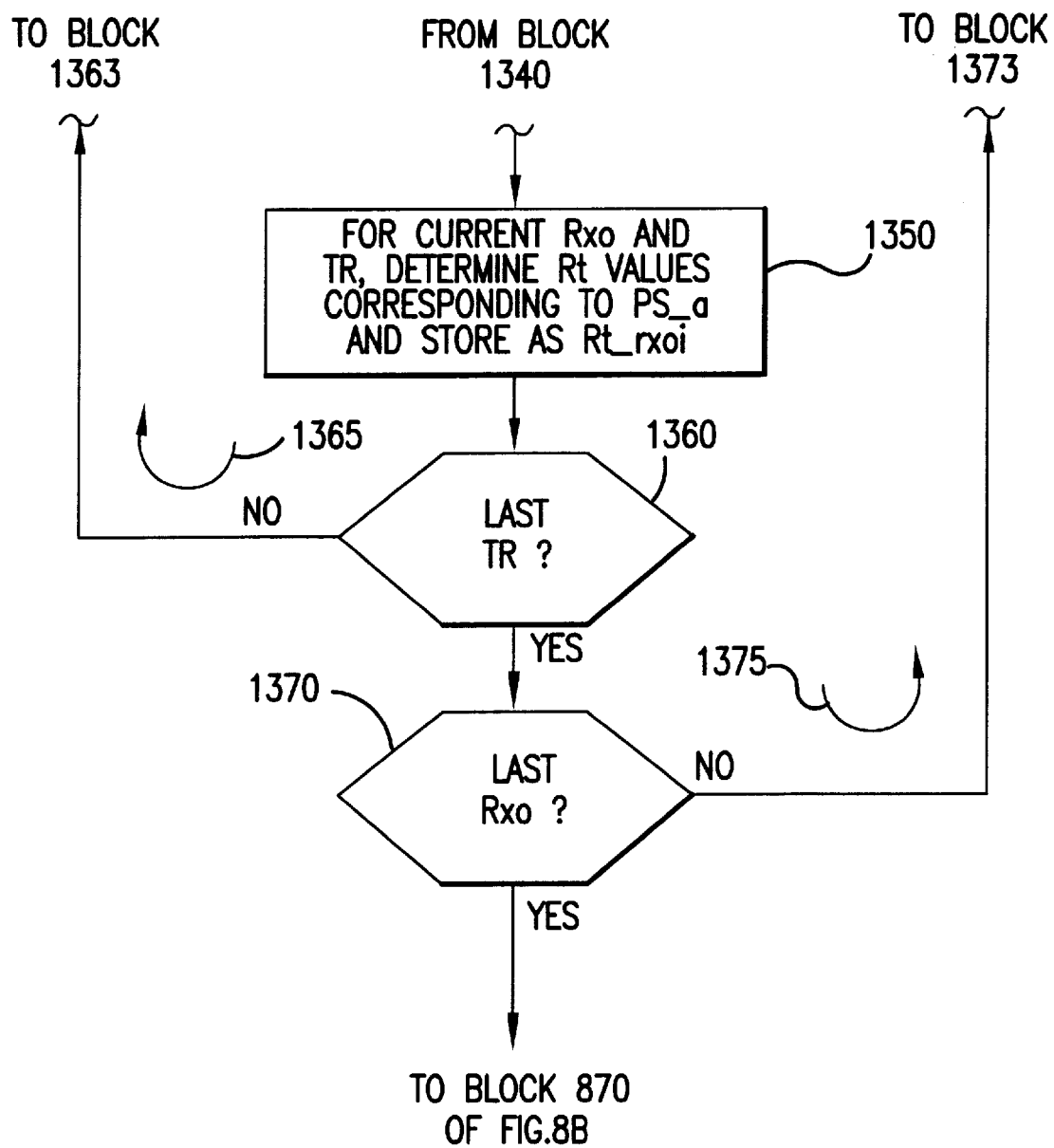
FIG. 13, which includes FIG. 13B placed below
Figure 15:
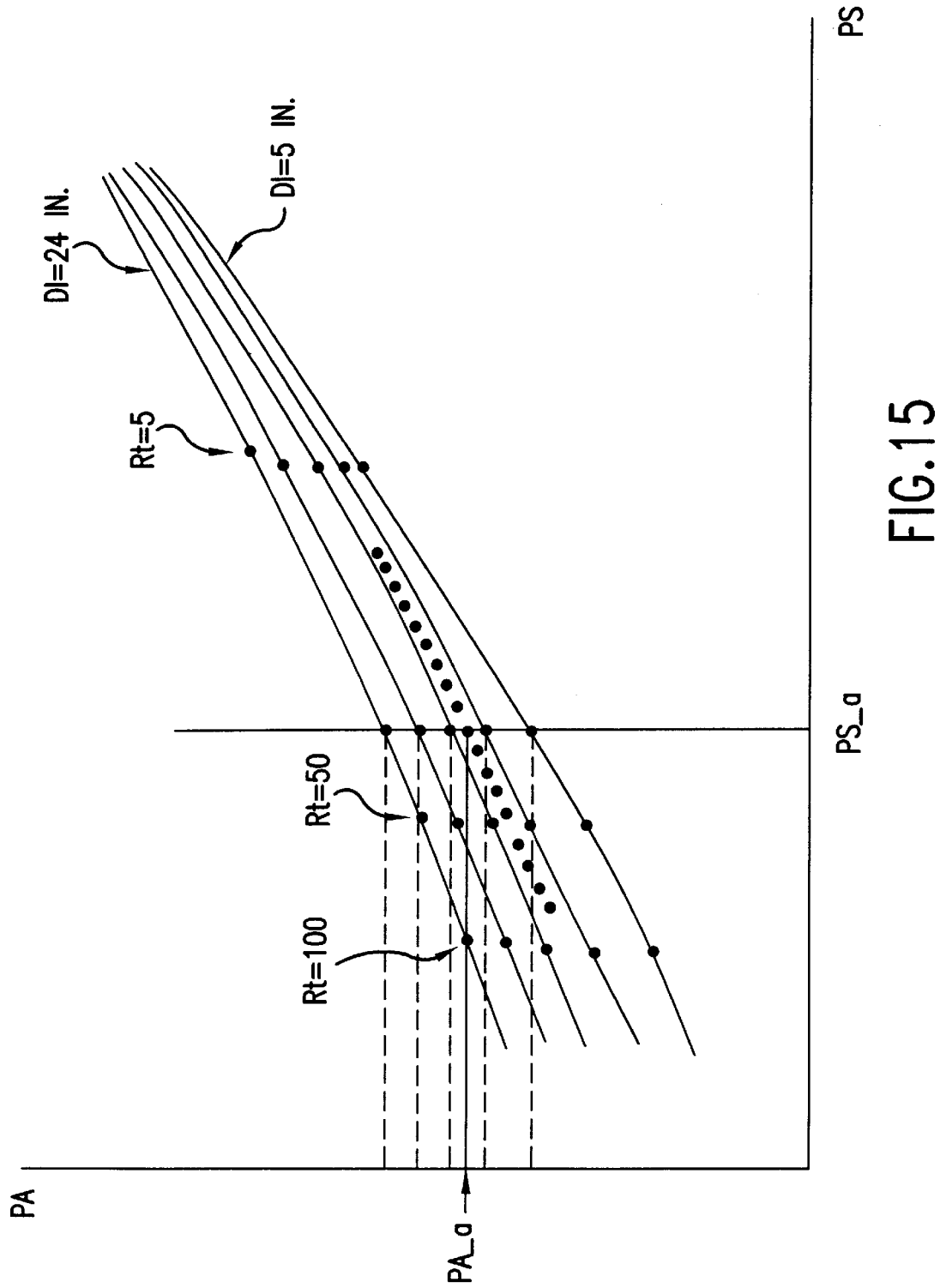
FIG. 15 is a graph of phase average versus phase shift for a particular invaded zone resistivity and a particular transmitter-to-receivers spacing that is useful in understanding the interpolations used in obtaining estimates of diameter of invasion and formation resistivity.

The routine for the two dimensional interpolation is set forth in conjunction with the flow diagram of FIG. 13, and illustrated in FIG. 15.

After determination of the estimates of diameter of invasion (DI) and uninvaded resistivity, Rt, for each TR spacing, a selection process is used to select the Rxo that results in the minimum spread in accordance with the selection rules set forth in Section 5. above. Simply stated, the selection process considers the consistency of the DI, and the Rt determinations for different ones of the TR spacings, and selects the Rxo that results in consistent values of DI and Rt. A further criterion, which requires that DI and Rxo are, for the most part, within normally expected ranges, is also used in a preferred embodiment hereof. It will be understood, however, that other suitable selection criteria could be utilized consistent with the principles of the invention. The routine for implementing the selection rules is represented by the block 870 and is described in conjunction with the flow diagram of FIG. 14. Having selected the Rxo, the inverted values of DI, and Rt can be determined as the respective mean values over the five longest spacings, and the values of Rxo, DI and Rt are read out and recorded, as represented by the block 875. The decision block 880 is then entered, this block representing inquiry as to whether the last depth level to be processed in the present pass has been reached. If not, the depth level index is incremented (block 885), block 855 is re-entered, and the loop 887 continues until all desired depth levels of the depth range have been processed. Readout can be, for example, to another storage or recording medium, or to a display (not shown). Although all the processing is shown as being performed at the borehole site in the illustrated embodiment, it will be understood that, if appropriate, the processing, or a portion thereof, can be performed remote from the borehole site, such as by communications link.

Figure 8A:
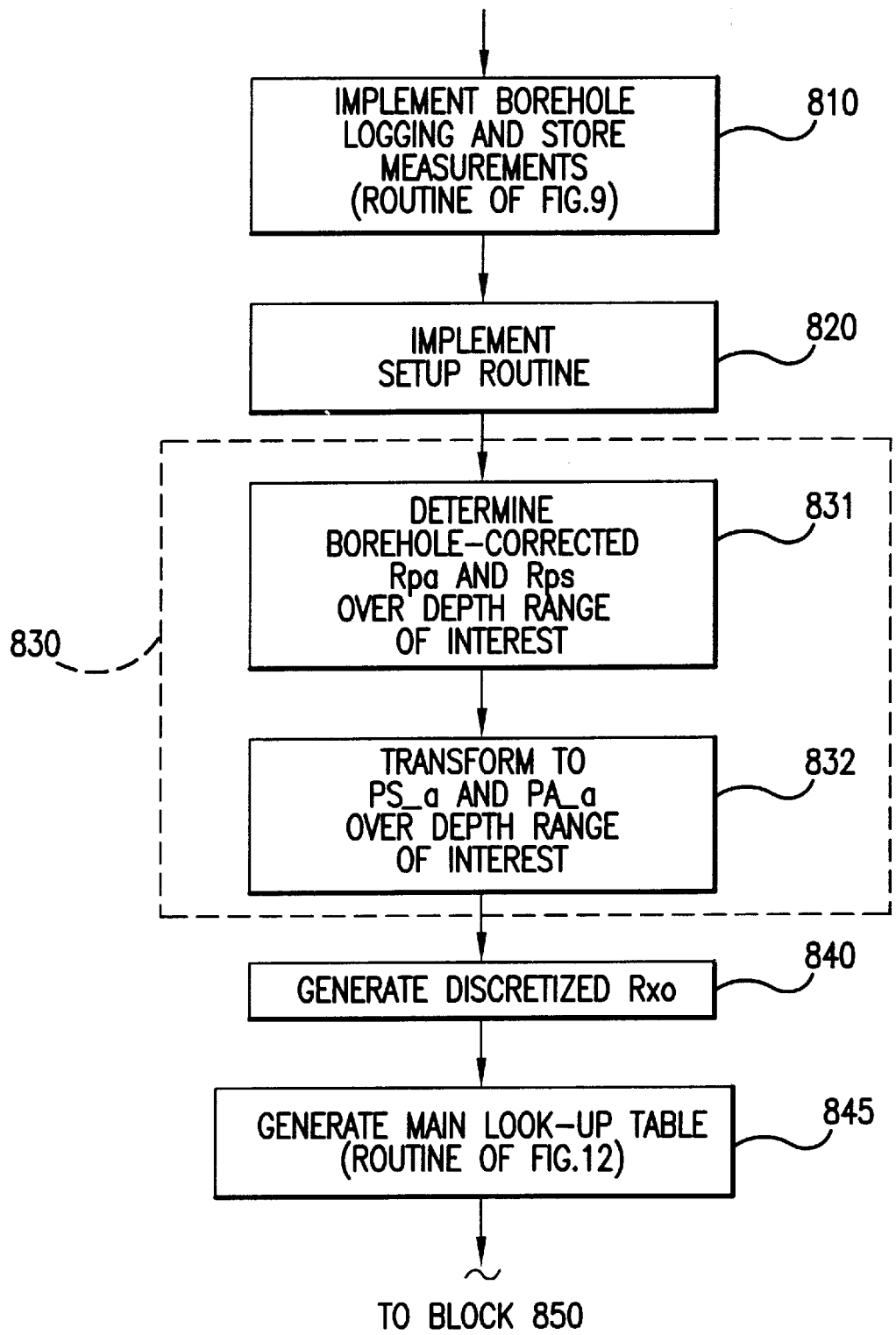
FIG. 8A, is a flow diagram which, in conjunction with the flow diagrams referred to therein, can be used in programming a processor or processors in implementing an embodiment of the invention.
Figure 9A:
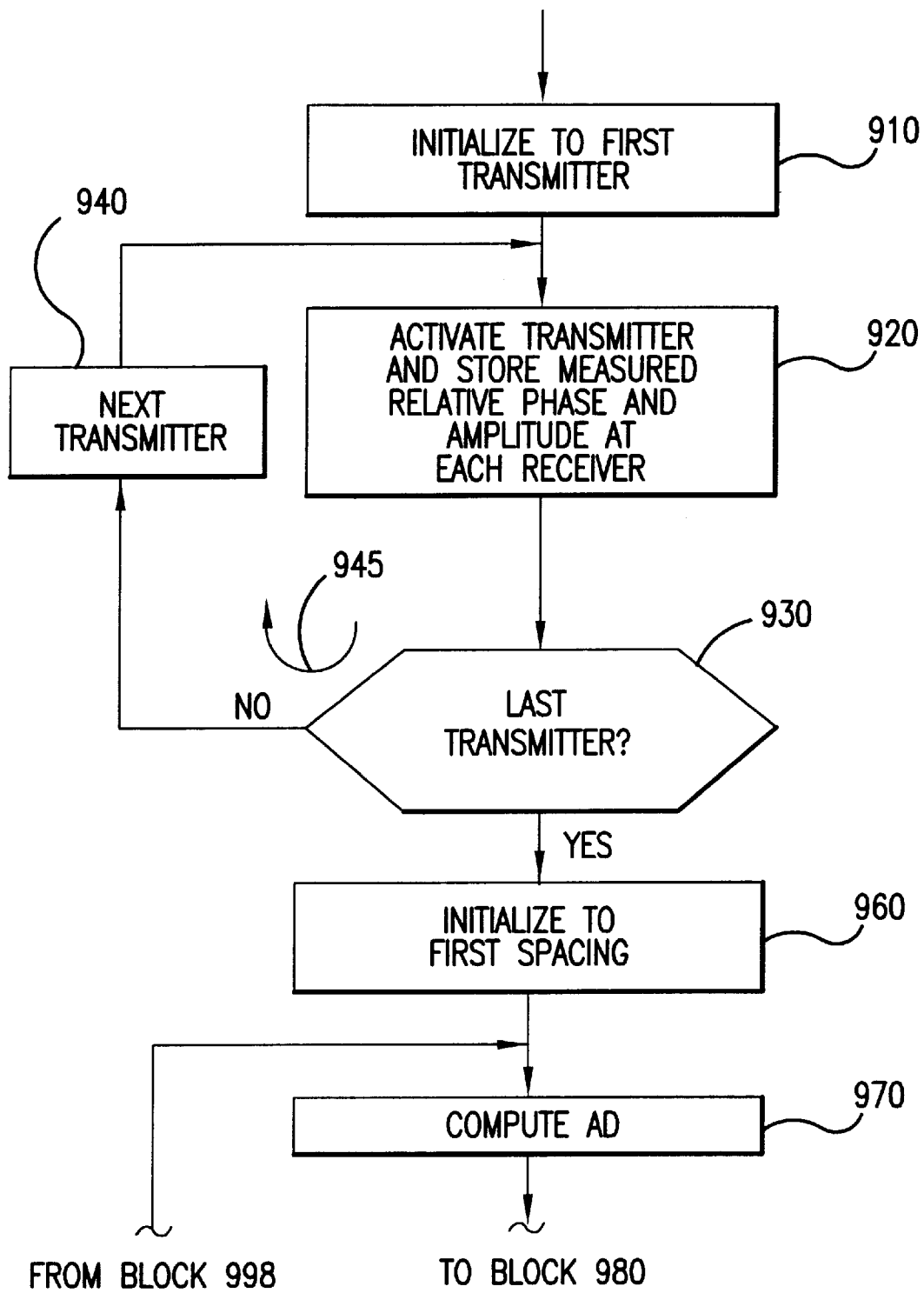
FIG. 9A, is a flow diagram of a routine for controlling a processor to implement borehole logging and storage of measurements.
Figure 9B:
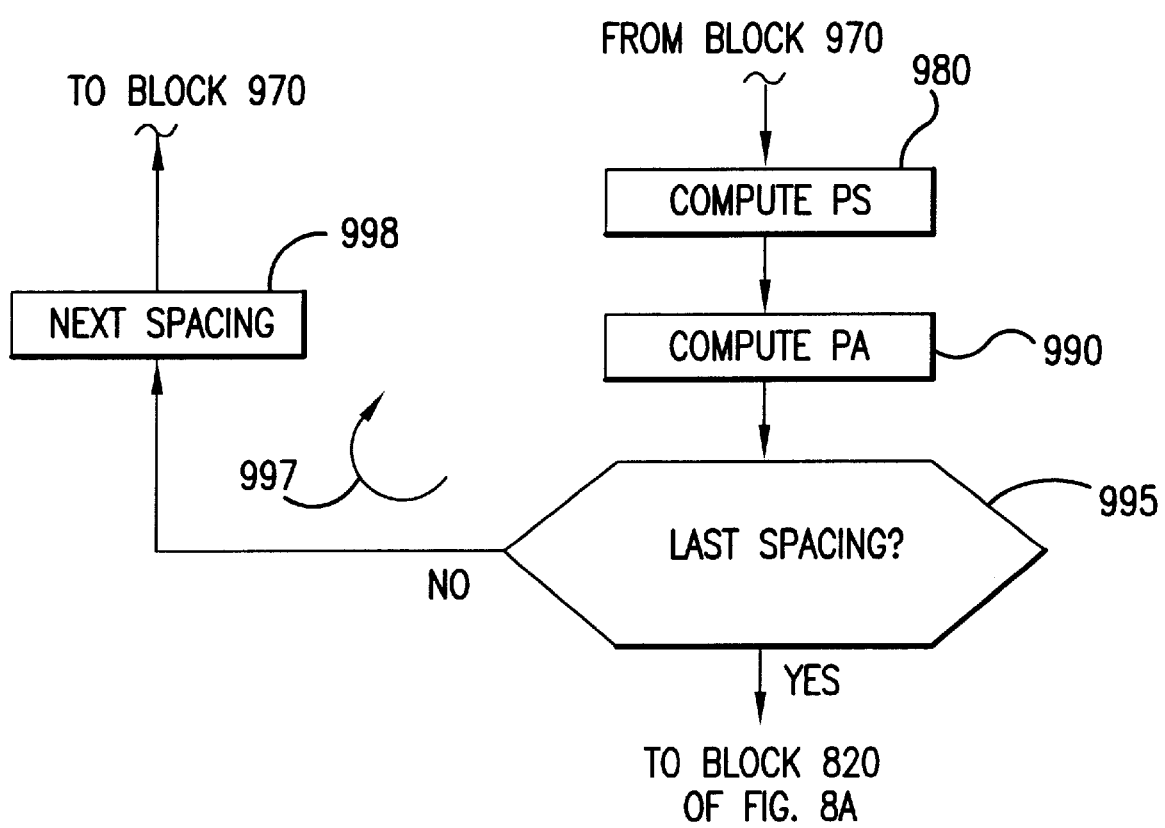
FIG. 9, which includes FIG. 9B placed below

Referring to FIG. 9, there is shown a flow diagram of a routine, represented generally by the block 810 of FIG. 8A, for controlling a processor (e.g. 270 of FIG. 2) of the embodiment of FIGS. 1 and 2, to implement borehole logging and store measurements. (The same type of routine can be used for any number of transmitters.) The blocks 910, 920, 930, and 940, and the loop 945, operate to sequentially cause energizing of each transmitter (T1 through T5, in this case), and the controlling of the measuring, at each receiver, of the relative phase and the amplitude of the received signals, associated with each energized transmitter. Reference can be made to the above referenced U.S. Pat. No. 5,594,343 for further details. It will be understood also that other techniques can be employed for implementing the measurements. The block 910 represents initializing to the first transmitter, and the block 920 represents activating the transmitter (by control of switch 275 of FIG. 2) and storing the relative phase and the amplitude measured at each of the receivers of the receiver pair R1 and R2 (see FIG. 2). The decision block 930 represents the determination of whether the last transmitter has been activated. If not, the block 940 is entered, the transmitter index is incremented, and the block 920 is re-entered. The loop 945 continues until all measurements have been made and stored for the present depth level.

The blocks 970, 980 and 990 are used to respectively compute, for each transmitter-to-receivers spacing, the attenuation AD, the phase shift PS, and the phase average PA from the relative phase and amplitude measurements at near receiver R1 (respectively designated $\phi_1$ and $A_1$) and the relative phase and amplitude measurements at far receiver R2 (respectively designated $\phi_2$ and $A_2$). In the present embodiment, the quantities AD, PS, and PA are computed from the following relationships:

$$AD=20\ \log_{10}[A_1/A_2]$$

$$PS=\phi_2-\phi_1$$

$$PA=(\phi_2+\phi_1)/2$$

The block 960 represents initializing to the first transmitter-to-receivers spacing, whereupon AD, PS and PA are computed, as indicated. (It can be noted that AD is not required for part of the processing hereof, as already described.) The decision block 995, increment block 998, and loop 997 are then continued until all spacings have been processed. Alternatively, the blocks 970, 980, and 990 could be under the block 920 in the loop 945, for computation of AD, PS, and PA directly after each set of measurements for a particular spacing is taken.

As described with reference to block 845 of FIG. 8, in an embodiment of the invention, a main look-up table is generated, relating Rxo, Rt, DI, and TR to PS and PA. FIG. 12 is a flow diagram of a routine for generating and storing the look-up table (the main or coarse grid look-up table) that is used, in this embodiment, to relate values of PS and PA to model values of transmitter-to-receivers spacing TR, diameter of invasion DI, invaded zone resistivity Rxo, and formation resistivity Rt. In generating PS as a function of TR, DI, Rxo, Rt, and PA as a function of TR, DI, Rxo and Rt, the index j is used to represent values of Rt, the index n is used to represent values of Rxo, the index k is used to represent values of DI, and the index l is used to represent values of TR. Thus, the values stored in the look-up table are designated as $PS_{njkl}$ and $PA_{njkl}$.

The coarse grid values of TR, DI, Rxo, and Rt to be used can cover the practical ranges encountered in logging conditions. Examples are DI in the range 5 inches to 200 inches and Rxo and Rt in the range 0.1 to 300 ohm-m. In the flow diagram of FIG. 12, the block 1205 represents the initializing of TR (index l) to its first value, the block 1210 represents the initializing of DI (index k) to its first value, the block 1215 represents the initializing of Rxo (index n) to its first value, and the block 1220 represents the initializing of Rt (index j) to its first value. Next, the block 1225, represents the computation and storage of $PS_{njkl}$, using forward modeling in a so-called step model shown in FIG. 11 (with an invaded zone of diameter DI, an invaded zone resistivity Rxo, a formation of resistivity Rt, and a transmitter-to-receivers spacing TR) in which the model parameters are defined by the described indices n, j, k, and l. Various techniques can be utilized to compute the amplitude and relative phase of electromagnetic energy at the frequency employed in the present embodiment, such as by using a routine for computation of the complex amplitude and phase at the receiver locations in media having a defined geometry and resistivities, and the specified spacings, all determined from the particular logging tool to be employed. An example of such a routine is described in the following publication: Anderson, B. and Chew, W. C., "A New High Speed Technique For Calculating Synthetic Induction And DPT Logs", SPWLA 25th Annual Logging Symposium (1984), Paper HH. Reference can also be made to the above-referenced U.S. Pat. No. 5,594,393 and to *Field Computation By Moment Methods,* Roger Harrington, IEEE Press 3rd Ed., 1993; and to *Electromagnetic Wave Theory,* Jim Kong, Wiley-Interscience, 1986.

It will be understood that other suitable techniques could be utilized to make the forward modeling computations. Accordingly, the previously referenced block 1225 represents the computation and storage of $PS_{njkl}$ for the current indices, and the block 1230 represents the computation and storage of $PA_{njkl}$ for the current indices. Subsequently, four nested loops, 1240, 1250, 1260 and 1270, are used to produce all combinations of the indices so that $PS_{njkl}$ and $PA_{nkjl}$ are obtained for all combinations of coarse grid values of TR, DI, Rxo and Rt. More specifically, the four nested loops 1240, 1250, 1260 and 1270, are respectively used to iterate the index values of n, j, k, and l. In the loop 1240, the determination of whether the last j (that is, the last Rt value) has been reached is represented by the decision block 1242, and the incrementing of the index j is represented by the block 1247. In the loop 1250, the decision as to whether the last n (that is, the last value of Rxo) has been reached is represented by the decision block 1252, and the incrementing of the index n is represented by the block 1257. Each time the loop 1250 is traversed, the index j is initialized (block 1255) for the next sequence in the subsidiary loop 1240. In the loop 1260, the decision as to whether the last k (that is, the last value of DI) has been reached is represented by the decision block 1262, and the incrementing of the index k is represented by the block 1267. Each time the loop 1260 is traversed, the indices j and n are initialized (block 1265) for the next sequence in the subsidiary loops 1250 and 1240. In the loop 1270, the decision as to whether the last l (that is, the last value of TR) has been reached is represented by the decision block 1272, and the incrementing of the index l is represented by the block 1277. Each time the loop 1270 is traversed, the indices j, n, and k are initialized (block 1275) for the next sequence in the subsidiary loops 1260, 1250, and 1240. In this manner, it will be seen that the coarse grid look-up table is computed and stored with $PS_{njkl}$ and $PA_{njkl}$ for all coarse grid values Rt (index j), Rxo (index n), DI (index k), and TR (index l).

Figure 8B:
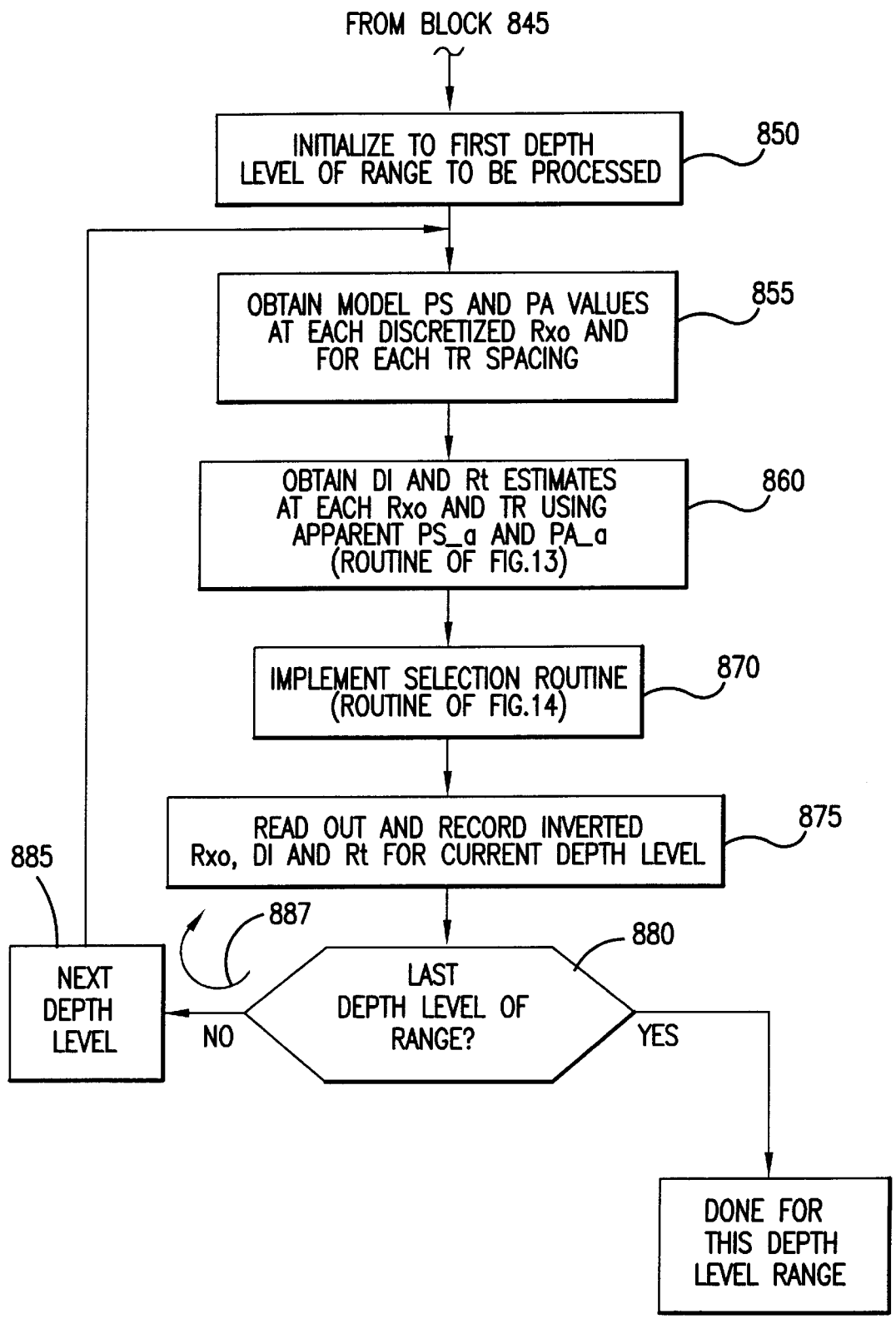
FIG. 8, which includes FIG. 8B placed below

Referring to FIG. 13, there is shown a flow diagram of the routine represented by the block 860 of FIG. 8B for obtaining DI and Rt estimates at each Rxo and TR using apparent phase shift PS_a and apparent phase average PA_a. The block 1310 represents initializing to the first Rxo value, and the block 1320 represents initializing to the first TR spacing. Next, for the current value of Rxo and the current TR spacing, the supplemental look-up table is used to determine the DI and Rt that correspond to the apparent phase shift PS—a and apparent phase average PA_a through a two dimensional interpolation. The two dimensional interpolation can be more easily visualized as the combination of one dimensional interpolations described in conjunction with blocks 1330, 1340 and 1350.

The procedure of the blocks 1330, 1340 and 1350 can be envisioned graphically from FIG. 15. In the step model of FIG. 11, PA and PS are each a function of Rxo, Rt, DI, and TR. For a particular spacing TR and a particular invaded zone resistivity Rxo, each of PS and PA are functions of the diameter of invasion DI and the formation resistivity, Rt. That is, $PS = f(DI, Rt)$ $PA = f(DI, Rt)$ Thus, for example, since PS and PA are both functions of DI and Rt, a plot of PS versus PA can be envisioned, for specific values of DI and Rt. An example of such a plot is illustrated in FIG. 15, which is a simplified version of FIG. 5B (with exemplary TR and Rxo values of TR=34 in. and Rxo=2 ohm-m) sketching just some of the curves for ease of illustration and explanation. There are five curves, one for each of five respective diameters of invasion. On each of these curves, the Rt value varies, generally with decreasing Rt for increasing PS and PA. The plot of FIG. 15 can be used to illustrate the interpolation represented by the blocks 1330, 1340 and 1350 of the FIG. 13 flow diagram. For a particular apparent value of PS (that is, PS_a), the five model diameters of invasion (DI) of the illustrated curves correspond to five values of PA, designated as PA_x values, shown by dots at the five intersections on the vertical line. In the interpolation of block 1340, the apparent phase average PA_a is used to interpolate between the PA_x values on either side of it to obtain an interpolated DI value. This DI value is called DI_rxoi. The DI value will lie at the intersection of PS_a and PA_a on an interpolated DI curve, as shown in dashed line in FIG. 15. The blocks 1330 and 1340 implement the functions just described of, first, determining the DI values (the intersection points), and then interpolating to obtain DI_rxoi. The block 1350 represents determination of the value Rt_rxoi by similarly interpolating between PS_a and values of the interpolated DI curves (dashed line of FIG. 15). Inquiry is then made (decision block 1360) as to whether the last TR has been reached. If not, TR is incremented (block 1363), the block 1330 is re-entered, and the loop 1365 is continued until all TR spacings have been considered. Inquiry is then made (decision block 1370) as to whether the last Rxo has been reached. If not, Rxo is incremented (block 1373), the block 1320 is re-entered, and the loop 1375 is continued until all Rxo values have been considered. In this manner, DI_rxoi and Rt_rxoi are obtained for all discretized Rxo and all TR spacings.

Figure 14A:
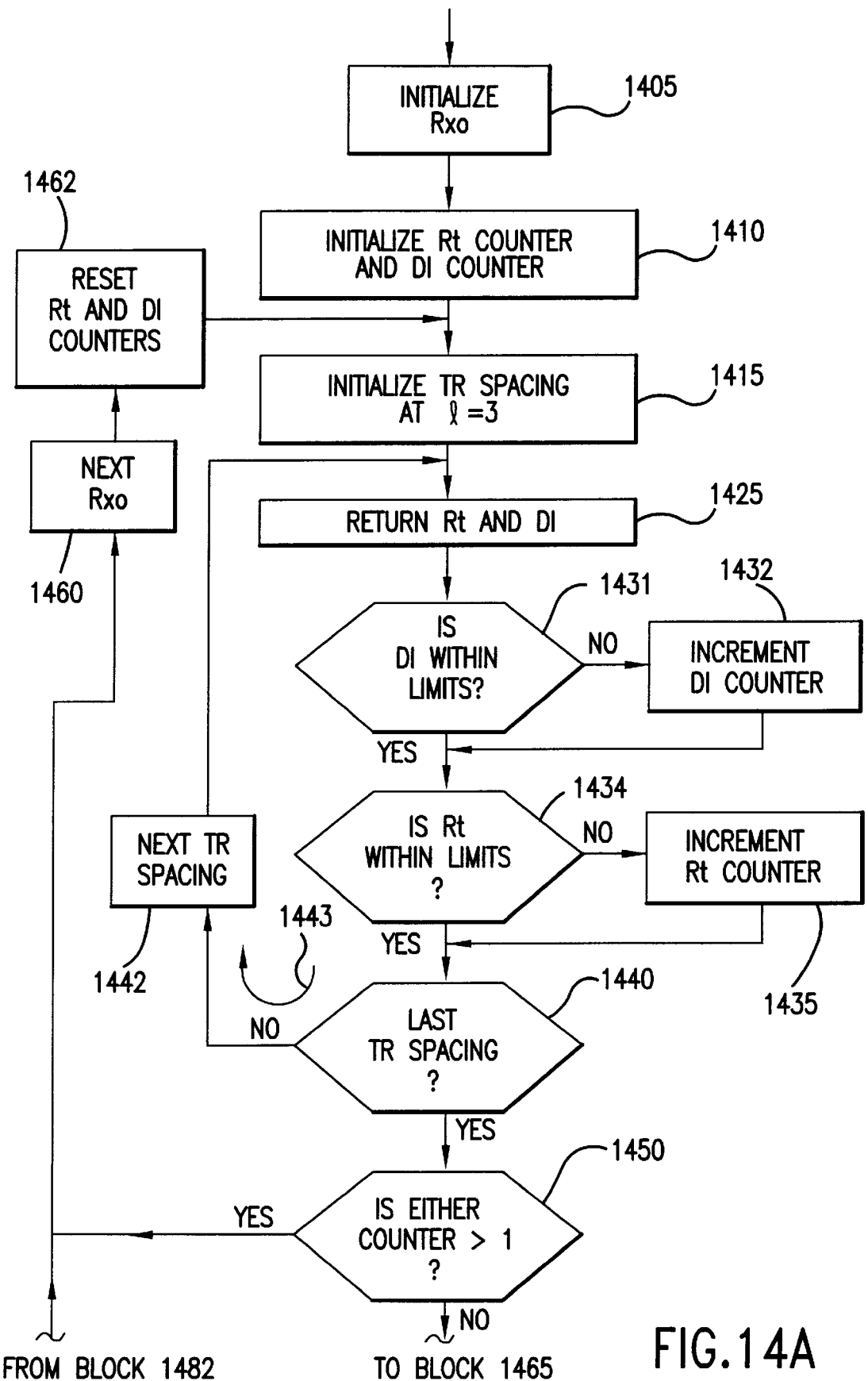
FIG. 14A, is a flow diagram of a routine for implementing a selection routine in accordance with an embodiment of the invention.
Figure 14B:
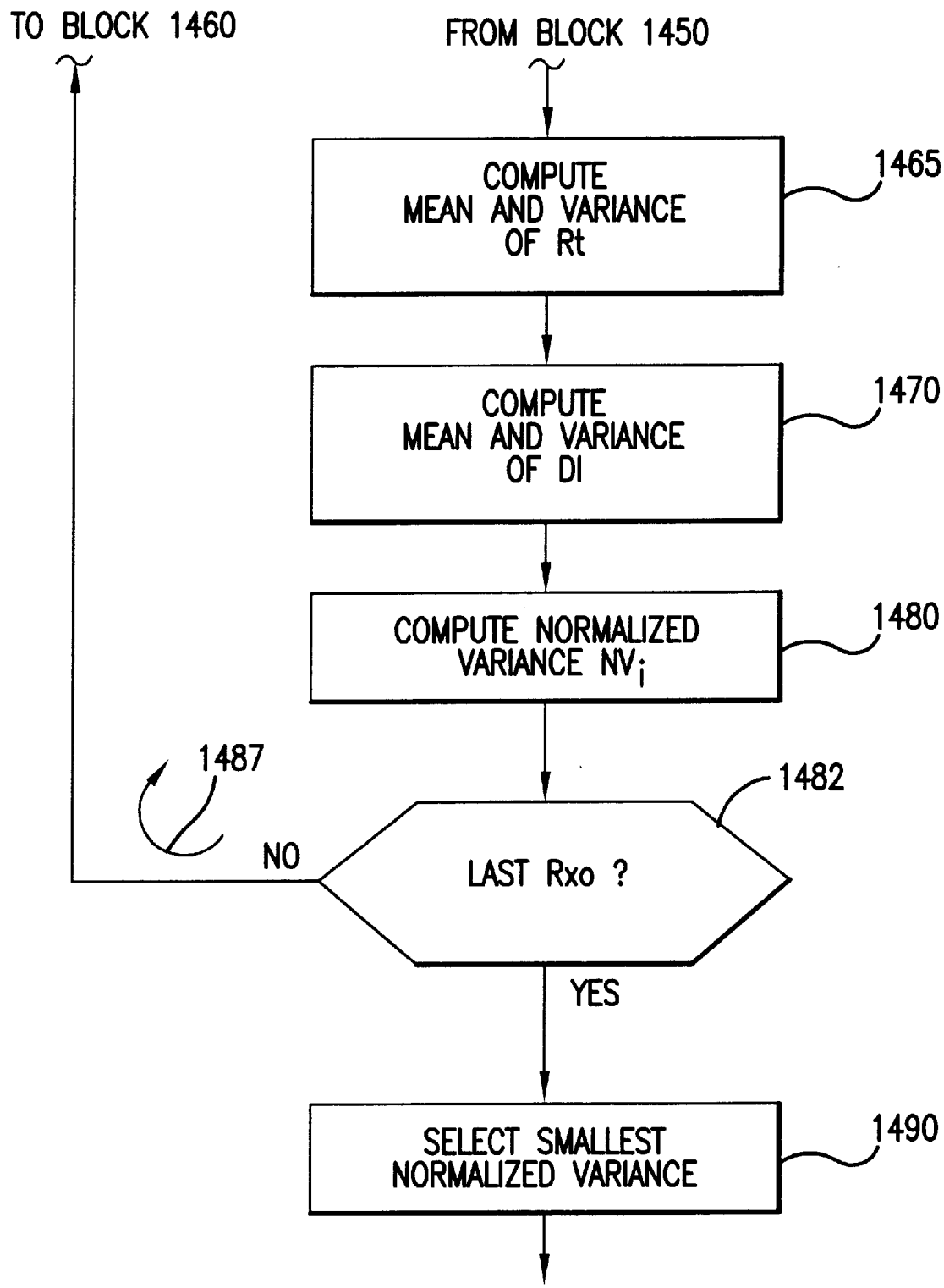
FIG. 14, which includes FIG. 14B placed below

Referring to FIG. 14, there is shown a flow diagram of the routine for implementing the selection of the Rxo that results in the minimal normalized variances of DI and Rt over a range of TR spacings, with the further requirement that DI and Rt are within specified ranges. For ease of explanation, the computations of normalized variances is shown as being performed in a separate routine, it being understood that these and other related computations could be made at the time that the DI and Rt estimates are first determined. The block 1405 represents initializing of Rxo to its first discretized value, the block 1410 represents initializing of an Rt counter and a DI counter (to be explained subsequently), and the block 1415 represents initializing to the first TR spacing. The previously determined Rt and DI (for the current Rxo and the current TR) are returned (block 1425) and determination is made (blocks 1431 and 1434), respectively, as to whether DI is within the prescribed range (block 1431) and whether Rt is within the prescribed range (block 1434), respective counters being incremented if an out-of-range determination is made (blocks 1432 and 1435). If Rt and DI are within the prescribed ranges, the counters will not be incremented. Determination is then made (decision block 1440) as to whether the last TR spacing has been reached. If not, the spacing is incremented to the next TR spacing (block 1442), the block 1425 is re-entered, and the loop 1443 is continued for all TR spacings being considered. When the last TR spacing has been reached, determination is made (decision block 1450) as to whether either of the DI or Rt counters has reached a count greater than 1. If so, the range criteria have not been met for the current Rxo, and it will not be considered for selection, so the block 1460 (incrementing to the next Rxo) is entered directly. If the counters are not greater than 1, the block 1465 is entered, and the mean and variance of Rt are computed for the current Rxo. Then, the mean and variance of DI are computed for the current Rxo (block 1470). Next, the normalized variance, designated $NV_j$, for the current Rxo is computed (block 1480). Inquiry is then made (decision block 1482) as to whether the last Rxo has been considered. If not, the block 1460 is entered for consideration of the next Rxo and the Rt and DI counters are reset to 0 (block 1462), and block 1415 is re-entered, for processing for the latest Rxo. The loop 1487 is then continued, and the normalized variance of Rt and DI is computed for all values of Rxo that have met the range requirements. The smallest normalized variance is then selected (block 1490).

As noted above, DI rather than Rxo can be initially discretized. In such case, block 855 would obtain model PA and PS values at each discretized diameter of invasion, DI. Then, in block 860, Rxo and Rt would be obtained at each DI and TR using the apparent phase shift PS_a and the apparent phase average PA_a. (In this case, PS and PA are both functions of Rxo and Rt.) This means that in FIG. 13, interpolation will obtain Rxo_dii (m,n,l) and Rt_dii (m,n,l) (see numbered Section 7. above) Then, the selection routine (block 870, routine of FIG. 14) will select the DIi(n) which yields the smallest combined normalized variance, as set forth in numbered Section 8. above. In this case, the final inverted parameters are given as $Rxo\_inv(m) = \text{Mean}(DI\_dii(m,\underline{n},l))$ over $l=3, 4, 5, 6, 7$ $Rt\_inv(m) = \text{Mean}(Rt\_dii(m,\underline{n},l))$ over $l=3, 4, 5, 6, 7$ $DI\_inv(m) = DIi(\underline{n})$ as also set forth in numbered Section 8.

When considerable time has passed after drilling, the diameter of invasion may be quite large for some formations. Therefore, in conjunction with logging techniques that are performed well after the drilling process, such as during so-called "wash down" where logging is performed using the drill string after drilling, or during wireline logging, it may be desirable to implement inversion using inherently deeper measurements, e.g. attenuation.

We claim:

1. A method for determining the properties of formations surrounding an earth borehole that have been invaded by borehole fluid to form an invaded zone, comprising the steps of:

(a) suspending a logging device in the borehole;
   (b) transmitting electromagnetic energy from a transmitter location on the logging device, and receiving the transmitted electromagnetic energy at receiver locations on the logging device for a first transmitter-to-receivers spacing associated with said transmitter and receiver locations;
   (c) determining, from the received electromagnetic energy, measurement characteristics associated with said first transmitter-to-receivers spacing;
   (d) repeating steps (b) and (c) for a plurality of further transmitter-to-receivers spacings to obtain measurement characteristics for said plurality of further transmitter-to-receivers spacings;
   (e) generating a model of formation of resistivity Rt with an invaded zone of resistivity Rxo and diameter of invasion DI;
   (f) selecting values of Rxo, DI, and Rt that would produce model measurement characteristics that substantially correspond, for each of a plurality of said transmitter-to-receiver spacings, with the actual measurement characteristics for the respective plurality of transmitter-to-receiver spacings; and
   (g) outputting the selected model values of at least one of Rxo, DI, and Rt.

2. The method as defined by claim 1, wherein said measurement characteristics comprise phase shift and phase average.

3. The method as defined by claim 2, wherein said phase shift and phase average are apparent phase shift and apparent phase average, respectively, which are derived as part of step (c).

4. The method as defined by claim 2, further comprising outputting said selected model values of each of Rxo, DI, and Rt.

5. The method as defined by claim 2, wherein said selecting of step (f) comprises varying trial values of Rxo, DI and Rt, and selecting a combination of trial values that produces correspondence of the model measurement characteristics and the actual measurement characteristics at the plurality of respective transmitter-to-receivers spacings.

6. The method as defined by claim 4, wherein said selecting of step (f) comprises varying trial values of Rxo, DI and Rt, and selecting a combination of trial values that produces correspondence of the model measurement characteristics and the actual measurement characteristics at the plurality of respective transmitter-to-receivers spacings.

7. The method as defined by claim 2, wherein said steps (e) and (f) include:

generating, for each of said transmitter-to-receivers spacings, look-up tables between Rxo, DI, Rt and the model measurement characteristics, and deriving said selected model values from said look-up tables and from the actual measurement characteristics.

8. The method as defined by claim 5, wherein said steps (e) and (f) include:
- (h) generating, for each of said transmitter-to-receivers spacings, look-up tables between Rxo, DI, Rt and PS, PA, where PS and PA are model phase shift and model phase average, respectively;
- (i) selecting a discretized value of Rxo;
- (j) interpolating in each of said look-up tables to obtain, for the particular transmitter-to-receivers spacing, and for a current discretized value of Rxo, respective subsidiary look-up tables defining, for the respective transmitter-to-receivers spacings, PS as a function of (DI, Rt) and PA as a function of (DI, Rt);
- (k) deriving, from the subsidiary look-up tables for the respective transmitter-to-receivers spacings and measured values of phase shift and phase average for the respective transmitter-to-receivers spacings, an estimate of diameter of invasion DI_est, and an estimate of formation resistivity RT_est;
- (l) repeating steps (j) and (k) for other discretized values of Rxo, to obtain DI_est and RT_est for the respective transmitter-to-receivers spacings for each discretized value of Rxo; and
- (m) choosing one of the discretized Rxo values as the selected model value of Rxo based on the DI_est and RT_est values resulting therefrom.

9. The method as defined by claim 6, wherein said steps (e) and (f) include:
- (h) generating, for each of said transmitter-to-receivers spacings, look-up tables between Rxo, DI, Rt and PS, PA, where PS and PA are model phase shift and model phase average, respectively;
- (i) selecting a discretized value of Rxo;
- (j) interpolating in each of said look-up tables to obtain, for the particular transmitter-to-receivers spacing, and for a current discretized value of Rxo, respective subsidiary look-up tables defining, for the respective transmitter-to-receivers spacings, PS as a function of (DI, Rt) and PA as a function of (DI, Rt);
- (k) deriving, from the subsidiary look-up tables for the respective transmitter-to-receivers spacings and measured values of phase shift and phase average for the respective transmitter-to-receivers spacings, an estimate of diameter of invasion DI_est, and an estimate of formation resistivity Rt_est;
- (l) repeating steps (j) and (k) for other discretized values of Rxo, to obtain DI_est and Rt_est for the respective transmitter-to-receivers spacings for each discretized value of Rxo; and
- (m) choosing one of the discretized Rxo values as the selected model value of Rxo based on the DI_est and Rt_est values resulting therefrom.

10. The method as defined by claim 5, wherein said steps (e) and (f) include:
- (h) generating, for each of said transmitter-to-receivers spacings, look-up tables between Rxo, DI, Rt and PS, PA, where PS and PA are model phase shift and model phase average, respectively;
- (i) selecting a discretized value of DI;
- (j) interpolating in each of said look-up tables to obtain, for the particular transmitter-to-receivers spacing, and for a current discretized value of DI, respective subsidiary look-up tables defining, for the respective transmitter-to-receivers spacings, PS as a function of (Rxo, Rt) and PA as a function of (Rxo, Rt);
- (k) deriving, from the subsidiary look-up tables for the respective transmitter-to-receivers spacings and measured values of phase shift and phase average for the respective transmitter-to-receivers spacings, an estimate of invaded zone resistivity Rxo_est, and an estimate of formation resistivity Rt_est;
- (l) repeating steps (j) and (k) for other discretized values of DI, to obtain Rxo_est and Rt_est for the respective transmitter-to-receivers spacings for each discretized value of DI; and
- (m) choosing one of the discretized DI values as the selected model value of DI based on the Rxo_est and Rt_est values resulting therefrom.

11. The method as defined by claim 6, wherein said steps (e) and (f) include:
- (h) generating, for each of said transmitter-to-receivers spacings, look-up tables between Rxo, DI, Rt and PS, PA, where PS and PA are model phase shift and model phase average, respectively;
- (i) selecting a discretized value of DI;
- (j) interpolating in each of said look-up tables to obtain, for the particular transmitter-to-receivers spacing, and for a current discretized value of DI, respective subsidiary look-up tables defining, for the respective transmitter-to-receivers spacings, PS as a function of (Rxo, Rt) and PA as a function of (Rxo, Rt);
- (k) deriving, from the subsidiary look-up tables for the respective transmitter-to-receivers spacings and measured values of phase shift and phase average for the respective transmitter-to-receivers spacings, an estimate of invaded zone resistivity Rxo_est, and an estimate of formation resistivity Rt_est;
- (l) repeating steps (j) and (k) for other discretized values of DI, to obtain Rxo_est and Rt_est for the respective transmitter-to-receivers spacings for each discretized value of DI; and
- (m) choosing one of the discretized DI values as the selected model value of DI based on the Rxo_est and Rt_est values resulting therefrom.

12. The method as defined by claim 2, wherein said step of suspending a logging device in the borehole comprises coupling a logging-while-drilling device in a drill string in the borehole.

13. The method as defined by claim 2, further comprising repeating said method at a multiplicity of depth level positions of said logging device in said borehole to obtain a log of at least one of Rxo, DI, and Rt.

14. The method as defined by claim 3, wherein said apparent phase shift and apparent phase average are derived from a technique comprising forming a first model of a fluid-containing borehole in a formation, deriving model parameters of borehole dimension, borehole fluid resistivity, and borehole-corrected formation resistivity for said first model using said measurement characteristics, and deriving said apparent phase shift and apparent phase average from the model parameters of said first model.

15. A method for determining the properties of formations surrounding an earth borehole that have been invaded by borehole fluid to form an invaded zone, comprising the steps of:
- (a) suspending a logging device in the borehole;
- (b) transmitting electromagnetic energy from a transmitter location on the logging device, and receiving the transmitted electromagnetic energy at receiver locations on the logging device for a first transmitter-to-receivers spacing associated with said transmitter and receiver locations;

(c) deriving, from the received electromagnetic energy, an apparent phase shift PS_a and an apparent phase average PA_a associated with said first transmitter-to-receivers spacing;

(d) repeating steps (b) and (c) for a plurality of further transmitter-to-receivers spacings to obtain PS_a and PA_a for said plurality of further transmitter-to-receivers spacings;

(e) generating a model of formation of resistivity Rt with an invaded zone of resistivity Rxo and diameter of invasion DI;

(f) selecting values of Rxo, DI, and Rt that would produce a model phase shift PS and a model phase average PA that substantially correspond, for each of a plurality of said transmitter-to-receiver spacings, with the PS_a and PA_a for the respective plurality of transmitter-to-receiver spacings; and (g) outputting the selected model values of at least one of Rxo, DI, and Rt.

16. The method as defined by claim 15, further comprising outputting said selected model values of each of Rxo, DI, and Rt.

17. The method as defined by claim 16, wherein said selecting of step (f) comprises varying trial values of Rxo, DI and Rt, and selecting a combination of trial values that produces correspondence of PS and PA with PS_a and PA_a at the plurality of respective transmitter-to-receivers spacings.

18. The method as defined by claim 15, wherein said steps (e) and (f) include:

generating, for each of said transmitter-to-receivers spacings, look-up tables between Rxo, DI, Rt and PS, PA, and deriving said selected model values from said look-up tables and from PS_a and PA_a.

19. The method as defined by claim 15, wherein said steps (e) and (f) include:

(h) generating, for each of said transmitter-to-receivers spacings, look-up tables between Rxo, DI, Rt and PS, PA;

(i) selecting a discretized value of Rxo;

(j) interpolating in each of said look-up tables to obtain, for the particular transmitter-to-receivers spacing, and for a current discretized value of Rxo, respective subsidiary look-up tables defining, for the respective transmitter-to-receivers spacings, PS as a function of (DI, Rt) and PA as a function of (DI, Rt);

(k) deriving, from the subsidiary look-up tables for the respective transmitter-to-receivers spacings and PS_a and PA_a for the respective transmitter-to-receivers spacings, an estimate of diameter of invasion DI_est, and an estimate of formation resistivity Rt_est;

(l) repeating steps (j) and (k) for other discretized values of Rxo, to obtain DI_est and Rt_est for the respective transmitter-to-receivers spacings for each discretized value of Rxo; and (m) choosing one of the discretized Rxo values as the selected model value of Rxo based on the DI_est and Rt_est values resulting therefrom.

20. The method as defined by claim 15, wherein said steps (e) and (f) include:

(h) generating, for each of said transmitter-to-receivers spacings, look-up tables between Rxo, DI, Rt and PS, PA;

(i) selecting a discretized value of DI;

(j) interpolating in each of said look-up tables to obtain, for the particular transmitter-to-receivers spacing, and for a current discretized value of DI, respective subsidiary look-up tables defining, for the respective transmitter-to-receivers spacings, PS as a function of (Rxo, Rt) and PA as a function of (Rxo, Rt);

(k) deriving, from the subsidiary look-up tables for the respective transmitter-to-receivers spacings and PS_a and PA_a for the respective transmitter-to-receivers spacings, an estimate of invaded zone resistivity Rxo_est, and an estimate of formation resistivity Rt_est;

(l) repeating steps (j) and (k) for other discretized values of DI, to obtain Rxo_est and Rt_est for the respective transmitter-to-receivers spacings for each discretized value of DI; and (m) choosing one of the discretized DI values as the selected model value of DI based on the Rxo_est and Rt_est values resulting therefrom.

21. The method as defined by claim 15, wherein said step of suspending a logging device in the borehole comprises coupling a logging-while-drilling device in a drill string in the borehole.

22. The method as defined by claim 15, further comprising repeating said method at a multiplicity of depth level positions of said logging device in said borehole to obtain a log of at least one of Rxo, DI, and Rt.

23. Apparatus for determining the properties of formations surrounding an earth borehole that have been invaded by borehole fluid to form an invaded zone, comprising:

(a) a logging device suspendible in the borehole;

(b) means for transmitting electromagnetic energy from a transmitter location on the logging device, and for receiving the transmitted electromagnetic energy at receiver locations on the logging device for a first transmitter-to-receivers spacing associated with said transmitter and receiver locations;

(c) means for determining, from the received electromagnetic energy, measurement characteristics associated with said first transmitter-to-receivers spacing;

(d) means for repeating operation of elements (b) and (c) for a plurality of further transmitter-to-receivers spacings to obtain measurement characteristics for said plurality of further transmitter-to-receivers spacings;

(e) means for generating a model of formation of resistivity Rt with an invaded zone of resistivity Rxo and diameter of invasion DI;

(f) means for selecting values of Rxo, DI, and Rt that would produce model measurement characteristics that substantially correspond, for each of a plurality of said transmitter-to-receiver spacings, with the actual measurement characteristics for the respective plurality of transmitter-to-receiver spacings; and (g) means for outputting the selected model values of at least one of Rxo, DI, and Rt.

24. Apparatus as defined by claim 23, wherein said measurement characteristics comprise phase shift and phase average.

25. Apparatus as defined by claim 23, wherein said selecting means is operative to vary trial values of Rxo, DI and Rt, and to obtain a combination of trial values that produces correspondence of the model measurement characteristics and the actual measurement characteristics at the plurality of respective transmitter-to-receivers spacings.

26. Apparatus as defined by claim 23, wherein said logging device is a logging-while-drilling device mountable in a drill string.

* * * * *